United States Patent Office 3,798,203
Patented Mar. 19, 1974

3,798,203
ANALOGUES OF HUMAN THYROCALCITONIN MODIFIED WITH CORRESPONDING AMINO ACIDS OF SALMON THYROCALCITONIN AND DERIVATIVES THEREOF
Max Brugger, Birsfelden, Bernhard Riniker, Frenkendorf, and Werner Rittel, Basel, Switzerland, assignors to Ciba-Geigy Corporation, Ardsley, N.Y.
No Drawing. Filed Oct. 15, 1970, Ser. No. 81,110
Claims priority, application Switzerland, Oct. 22, 1969, 15,786/69
Int. Cl. C07c 103/52; C07g 7/00; C08h 1/00
U.S. Cl. 260—112.5                         10 Claims

ABSTRACT OF THE DISCLOSURE

Hypocalcaemic peptide amides of the formula

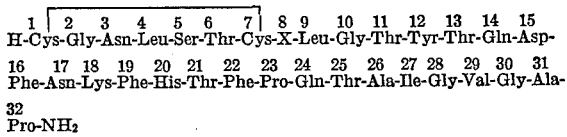

wherein X represents the radical of L-methionine, L-valine, L-norvaline, L-leucine, L-isoleucine, L-norleucine or L-α-aminobutyric acid and wherein at least one of the aminoacids in positions 11, 12, 16, 17, 19, 20, 22 and 24 is replaced by another aminoacid, namely L-threonine[11] by L-lysine, L-tyrosine[12] by L-leucine, L-phenylalanine[16] by L-Leucine, L-asparagine[17] by L-histidine, L-phenylalanine[19] by L-leucine, L-histidine[20] by L-glutamine, L-phenylalanine[22] by L-tyrosine and L-glutamine[24] by L-arginine.

---

The subjects of the invention are new hypocalcaemically active peptides of Formula I

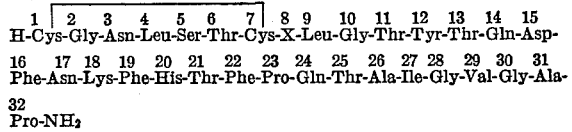

wherein X represents the L-methionine, L-valine, L-norvaline, L-leucine, L-isoleucine, L-norleucine or L-α-aminobutyric acid radical and wherein at least one of the aminoacids in positions 11, 12, 16, 17, 19, 20, 22 and 24 is replaced by another aminoacid and in particular with L-threonine[11] being replaced by L-lysine, L-tyrosine[12] by L-Leucine, L-phenylalanine[16] by L-leucine, L-asparagine acid[17] by L-histidine, L-phenylalanine[19] by L-leucine, L-histidine[20] by L-glutamine, L-phenylalanine[22] by L-tyrosine and L-glutamine[24] by L-arginine, their derivatives, as well as acid addition salts and complexes of these compounds and processes for their manufacture.

As derivatives, N$^\alpha$-acyl derivatives as well as desamino[1]-peptides should above all be mentioned.

Acyl groups for the acylation of the N$^\alpha$-amino group are the radicals of carboxylic acids such as aliphatic, aromatic, araliphatic, heterocyclic and heterocyclyl-aliphatic carboxylic acids, especially the radicals of lower monobasic or dibasic alkane-acids or alkene-acids such as formic acid, acetic acid, propionic acid, butyric acids, acrylic acid or succinic acid, of alicyclic carboxylic acids, such as cycloalkyl carboxylic acids, of monobasic or dibasic monocyclic aromatic carboxylic acids such as unsubstituted and substituted benzoic acid or phthalic acid, of unsubstituted and aryl-substituted aryl-lower alkyl- carboxylic acids or alkenyl-carboxylic acids such as phenylacetic acid, of unsubstituted or substituted monobasic or dibasic 5-membered to 6-membered heterocyclic acids with nitrogen, sulphur and/or oxygen as hetero-atoms, such as pyridinecarboxylic acids, or thiophenecarboxylic acids, or of heterocyclyl-lower alkane-acids such as pyridylacetic acid or imidazolylacetic acid, wherein the substituents of the rings are for example halogen atoms, nitro groups, lower alkyl or lower alkoxy groups or lower carbalkoxy groups. Further acyl radicals to be mentioned are above all acyl radicals of amino acids especially of α-aminoacids, such as for example glycyl, L-leucyl and L-pyroglutamyl, and also acyl radicals which are derived from carbonic acid or thiocarbonic acid or their esters or amides, for example lower alkyloxycarbonyl groups such as ethoxycarbonyl or tert.-butoxycarbonyl, and also benzyloxycarbonyl which is unsubstituted or substituted as indicated above, carbamoyl and thiocarbamoyl as well as N-substituted carbamoyl and thiocarbamoyl, for example N-lower alkylcarbamoyl, N-phenylcarbamoyl and N-phenyl-thiocarbamoyl.

As acid addition salts, salts of therapeutically usable acids such as hydrochloric acid, acetic acid, sulphuric acid, phosphoric acid and sulphonic acids, such as lower alkanesulphonic acids, benzenesulphonic acid or toluenesulphonic acid, should especially be mentioned.

By complexes there are to be understood the compounds of as yet unclarified structure, which are produced on adding certain inorganic or organic substances to long-chain peptides and which impart a prolonged action to the latter. Such substances can for example be described for ACTH and other adrenocorticotropically active peptides. Compounds to be mentioned are, for example, inorganic compounds such as are derived from metals such as calcium, magnesium, aluminium, cobalt and especially zinc, above all sparingly soluble salts such as phosphates, pyrophosphates and polyphosphates, as well as hydroxides of these metals, and also alakli metal polyphosphates such as for example "CalgonN," "Calgon 322," "Calgon 188" or "Polyron B 12." Organic substances which cause a prolongation of the action are for example non-antigenic gelatines, for example polyhydroxygelatine, polyvinylpyrrolidone and carboxymethylcellulose, and also sulphonic acid esters or phosphoric acid esters of alginic acid, dextran, polyphenols and polyalcohols, above all polyphoretine-phosphate and phytic acid, as well as polymers and copolymers of basic aminoacids or above all of acid aminoacids, for example protamine or polyglutamic acid.

The new compounds display a hypocalcaemic action. They lower the plasma calcium and phosphate content of the blood of mammals, as has been demonstrated through experiments on rats. They can be used in case of hypercalcaemia, osteoporosis or osteitis deformans. For therapeutic purposes, doses of 0.005 to 0.5 mg. of the new compounds are administered parenterally from one to seven times weekly as required. The daily doses should preferably not exceed 1 mg.

The process according to the invention for the manufacture of new peptide-amides, their derivatives, their acid addition salts and complexes is characterized in that
(1) The protective group or groups are removed from compounds of Formula I

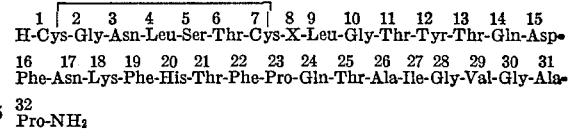

wherein X has the indicated significance and at least one of the aminoacids in positions 11, 12, 16, 17, 19, 20, 22 and 24 is replaced by the abovementioned aminoacids, or from their derivatives, in which compounds at least one amino group or one carboxyl group is protected by a removable protective group, or

(2) Compounds of Formula II 1 2 3 4 5 6 7 8 9 10 11 12 13 14 15
H-Cys-Gly-Asn-Leu-Ser-Thr-Cys-X-Leu-Gly-Thr-Tyr-Thr-Gln-Asp-
16 17 18 19 20 21 22 23 24 25 26 27 28 29 30 31
Phe-Asn-Lys-Phe-His-Thr-Phe-Pro-Gln-Thr-Ala-Ile-Gly-Val-Gly-Ala-
32
Pro-NH$_2$    (II)

wherein X has the indicated significance and at least one of the aminoacids in positions 11, 12, 16, 17, 19, 20, 22 and 24 is replaced by the abovementioned aminoacids, or their derivatives wherein the mercapto groups are free or protected by the trityl group, are oxidized to disulphides and that, if desired, the resulting peptide-amides are converted into their acid addition salts or complexes.

In the manufacture of the starting substances for the 1st variant of the process according to the invention, and also in the manufacture of all intermediate products required in both process variants, possible protective groups are especially the protective groups, known from the synthesis of long-chain peptides, which can easily be split off, for example by hydrolysis, reduction, aminolysis or hydrazinolysis.

Thus, for example, acyl or aralkyl groups, such as formyl, trifluoracetyl, phthaloyl, benzenesulphonyl, p-toluenesulphonyl, o-nitrophenylsulphenyl, and 2,4-dinitrophenylsulphenyl groups (these sulphenyl groups can also be removed by the action of nucleophilic reagents, for example sulphites or thiosulphates, compare British Pat. 1,104,271) optionally substituted benzyl groups, for example benzyl groups substituted by lower alkoxy groups, especially o- or p-methoxy groups, or diphenylmethyl or triphenylmethyl groups, or groups derived from carbonic acid such as arylmethoxycarbonyl groups which are optionally substituted in the aromatic rings, for example by halogen atoms such as chlorine or bromine, nitro groups, lower alkyl or lower alkoxy groups or chromophoric groups, for example azo groups, in which arylmethoxycarbonyl groups the methylene group can be substituted by a further aryl radical and/or one or optionally two lower alkyl radicals, such as benzyl, benzhydryl- or 2-phenyl-isopropyl-oxycarbonyl groups, for example carbobenzoxy, p-bromocarbobenzoxy or p-chlorocarbobenzoxy, p-nitrocarbobenzoxy or p-methoxycarbobenzoxy, p-phenylazo-benzyloxycarbonyl and p-(p'-methoxyphenylazo)-benzyloxycarbonyl, 2-tolyl-isopropoxycarbonyl and especially 2-(p-biphenylyl)-isopropoxycarbonyl, as well as aliphatic oxycarbonyl groups such as adamantyloxycarbonyl, cyclopentyloxycarbonyl, 2,2,2-trichlorethoxycarbonyl, 2-iodethoxycarbonyl, tert.amyloxycarbonyl or above all tert. butoxycarbonyl, are used as protective groups for amino groups.

The amino groups can also be protected by the formation of enamines, obtained by reaction of the amino group with 1,3-diketones, for example benzoylacetone, acetylacetone or dimedone.

Carboxyl groups are for example protected by amide or hydrazide formation or by esterification. The amide and hydrazide groups can optionally be substituted, the amide group for example by the 3,4-dimethoxybenzyl or bis-(p-methoxyphenyl)-methyl group, the hydrazide group for example by the carbobenzoxy group, the trichlorethoxycarbonyl group, the trifluoracetyl group, the trityl group, the tert.-butoxycarbonyl group or the 2-(p-biphenylyl-isopropoxycarbonyl group. Suitable substances for the esterification are for example lower optionally substituted alkanols such as methanol, ethanol, cyanomethyl alcohol, 2,2,2-trichlorethanol, 2-iodethanol, benzoylmethyl alcohol or especially tert.-butanol, and also aralkanols such as aryl-lower alkanols, for example benzyl alcohols or benzhydryl alcohols which are optionally usbstituted by lower alkyl or lower alkoxy groups or halogen atoms, such as p-nitrobenzyl alcohol, p-methoxybenzyl alcohol or 2,4,6-trimethylbenzyl alcohol, phenols and thiophenols which are optionally substituted by electron-attracting substituents, such as thiophenol, thiocresol, p-nitrothiophenol, 2,4,5- and 2,4,6-trichlorophenol, pentachlorophenol, p-nitrophenol, 2,4-dinitrophenol, p-cyanophenol or p-methanesulphonylphenol, and also, for example, N-hydroxysuccinimide, N-hydroxyphthalimide, N-hydroxypiperidine or 8-hydroxyquinoline.

Hydroxyl groups of the serine, threonine and tyrosine radicals can for example be protected by esterification or etherification. Possible acyl radicals in the esterification are for example lower alkanoyl radicals such as acetyl, aroyl radicals such as benzoyl and above all radicals derived from carbonic acid such as benzyloxycarbonyl or ethoxycarbonyl. Suitable groups for the etherification are, for example, benzyl, tetrahydropyranyl or tert.butyl radicals. The 2,2,2-trifluoro-1-tert.-butoxy-carbonylaminoethyl or -1-benzyloxycarbonylaminoethyl group described in Ber. 100 (1967), 3838–3849 (Weygand) are also suitable for protecting the hydroxyl groups. However, the hydroxyl groups do not necessarily have to be protected.

The mercapto groups of the cysteine radicals are for example protected by acylation or alkylation. A suitable radical for the acylation is, for example, the acetyl or benzoyl radical, the ethylcarbamoyl radical or the optionally substituted carbobenzoxy radical. Suitable radicals for alkylation are, for example, the tert.-butyl radical or benzylthiomethyl radical or optionally substituted arylmethyl groups such as benzyl, p-nitrobenzyl, diphenylmethyl, dimethoxybenzhydryl or trityl, and also phenylcyclohexyl, thienyl(2)-cyclohexyl and others, compare Ber. 101 (1968), 681, as well as, for example, the acetylaminomethyl radical, compare Tetrahedron Letters No. 26 (1968), page 3057. The imino group of the histidine does not necessarily have to be protected, but it can be of advantage to protect it, for example by benzyl, trityl, carbobenzoxy, adamantyloxycarbonyl or the abovementioned Weygand groups.

In the 1st variant of the process according to the invention, the tert.-butyl ester group is preferably used for protecting the carboxyl group of the side chain and, where relevant, the terminal carboxyl group, the tert.-butoxycarbonyl group is preferably used for protecting the amino group of the side chain, the tert.-butyl ether group is preferably used for the hydroxyl groups of the serine, threonine and tyrosine radicals, where these are protected at all, and the 2,2,2-trifluoro-1-tert.-butoxycarbonylaminoethyl group is preferably used for protecting the imino group of the histidine, where desired. All these protective groups can, where desired, be removed in one step by acid hydrolysis, for example by means of trifluoracetic acid, hydrochloric acid or hydrogen fluoride. In the case of the synthesis of the protected dotriacontapeptide used as the starting material in the 1st process variant, using protective groups which can be removed with trifluoracetic acid or hydrochloric acid, the mercapto groups are preferably protected by benzyl or trityl. The S-trityl groups can be removed selectively from the protected peptide in organic solution (whilst retaining the groups which can be removed with trifluoracetic acid) by means of mercuric acetate and hydrogen sulphide. The S-benzyl groups can be selectively removed from the protected peptide with sodium in liquid ammonia. In both cases the protected peptide with free mercapto groups is obtained. This can be oxidized to give the protected disulphide, for example with iodine in glacial acetic acid, with diiodethane in organic solvents or with atmospheric oxygen in liquid ammonia. It is particularly advantageous to protect the mercapto groups by trityl groups and to remove these from the protected peptide, with simultaneous formation of the disulphide bridge, by means of iodine in methanol or glacial acetic acid. The formation of the disulphide ring can be carried out at the stage of a partial sequence containing the two cysteine radicals, for example the decapeptide 1–10, or at the stage of the dotriacontapeptide-amide.

In the 2nd process variant of the process according to the invention, the open-chain peptide used as the starting material can preferably again be manufactured with the protective groups mentioned for variant (1). The S-trityl groups can be removed with trifluoracetic acid and the free open-chain peptide can be oxidized in a known manner by potassium ferricyanide in aqueous solution or by iodine or with air in liquid ammonia. It is however also possible to remove the trityl groups according to the abovementioned process with iodine and methanol, with simultaneous disulphide formation.

In the manufacture of the N-acyl derivatives, the acyl group can be used as an amino protective group.

The resulting peptides can subsequently be converted into their acid addition salts and/or complexes in a manner which is in itself known.

The formation of acid addition salts is effected in a known manner.

The formation of complexes also takes place according to known methods, or methods equivalent to these.

Complexes with inorganic substances such as sparingly soluble metal compounds, for example aluminium or zinc compounds, are preferably manufactured in an analogous manner to that known for ACTH, for example by reaction with a soluble salt of the particular metal, for example zinc chloride or zinc sulphate, and precipitation with an alkali metal phosphate and/or alkali metal hydroxide. Complexes with organic compounds, such as polyhydroxy-gelatine, carboxymethylcellulose, polyvinylpyrrolidone, polyphloretine phosphate, polyglutamic acid and the like, are obtained by mixing these substances with the peptide in aqueous solution. Insoluble compounds with alkali metal polyphosphates can also be manufactured in the same manner.

The invention also relates to those embodiments of the process in which one starts from an intermediate product obtainable at any process stage and carries out the missing steps, or in which the process is stopped at any stage and/or a starting substance is formed in situ and/or is used in the form of a salt.

The peptides used as starting substances are obtained if the aminoacids are, with the use of easily removable protective groups if required or desired, linked individually or after prior formation of smaller peptide units, in the sequence mentioned, with the disulphide bridge optionally being formed at a suitable stage of the synthesis. The methods of linkage which are suitable for the manufacture of long-chain peptides, taking the disulphide bridge into account, such as are known from the literature, are advantageously used.

The aminoacid units and/or peptide units are therefore, for example, linked by reacting an aminoacid or a peptide with a protected α-amino group and activated terminal carboxyl group with an aminoacid or a peptide with a free α-amino group and free or protected, for example esterified or amidized, terminal carboxyl group, or by reacting an aminoacid or a peptide with an activated α-amino group and protected terminal carboxyl group with an aminoacid or a peptide with a free terminal carboxyl group and protected α-amino group. The carboxyl group can for example be activated by conversion into an acid azide, anhydride or imidazolide or an activated ester, such as a cyanomethyl ester, thiophenyl ester, p-nitro-thiophenyl ester, thiocresyl ester, p-methanesulphonylphenyl ester, p-nitrophenyl ester, 2,4-dinitrophenyl ester, 2,4,5- or 2,4,6-trichlorophenyl ester, pentachlorophenyl ester, N-hydroxysuccinimide ester, N-hydroxyphthalimide ester, 8-hydroxyquinoline ester, N-hydroxypiperidine ester, or by reaction by means of a carbodiimide (optionally with the addition of N-hydroxysuccinimide or unsubstituted or, for example, halogen-substituted, methyl-substituted or methoxy-substituted 1-hydroxybenzotriazole) or N,N'-carbonyldiimidazole, or an isoxazolium salt, for example Woodward reagent, and the amino group can for example be activated by reaction with a phosphite. As the most customary methods there should be mentioned the carbodiimide method, the method according to Weygand-Wünsch (carbodiimide in the presence of N-hydroxysuccinimide, the azide method, the method of activated esters and the anhydride method, and also the Merrifield method and the method of the N-carboxyanhydrides or N-thiocarboxyanhydrides.

In the manufacture of the starting substances it is advantageous to start from a sequence which includes the first 10 N-terminal aminoacids, and to condense the entire remaining sequence with this N-terminal sequence, preferably according to Weygand-Wünsch.

It is however also for example possible to link the N-terminal sequence mentioned with the fragment up to the 28th aminoacid (glycine) having a free terminal carboxyl group, and to condense the octacosapeptide with the tetrapeptide of the aminoacids 29–32, for example according to Weygand-Wünsch.

The following text explains the manufacture of the peptide of Formula I, in which the 17th aminoacid is replaced by L-histidine, the 19th by L-leucine and the 20th by L-glutamine, as an example of a preferred embodiment. The schematic charts show special procedures which can of course be replaced by equivalent procedures.

In the figures and in the examples the symbols have the following meaning:

(1) the azide method
(2) the method of mixed anhydrides
(3) the method of activated esters, especially p-nitrophenyl esters (ONP) or hydroxysuccinimide esters (OSU)
(4) the carbodiimide method
(5) the method according to Weygand-Wünsch
BOC—tert.butoxycarbonyl
DPC—2-(p-biphenylyl)-isopropoxycarbonyl
Z—carbobenzoxy
TRI—trityl
Bzl—benzyl
OtBu—tert.-butyl ester
OBzl—benzyl ester
ONB—p-nitrobenzyl ester
ONP—p-nitrophenyl ester
OMe—methyl ester
OEt—ethyl ester
OCP—2,4,5-trichlorophenyl ester
tBu—tert.-butyl ether
Ac—acetyl
Bmp—β-mercaptopropionyl
TFA—trifluoracetic acid The N-terminal decapeptide (1–10) can for example be synthesized from sequences 1–4 and 5–10 or 1–5 and 6–10 or 1–6 and 7–10 or 1–7 and 8–10, as can be seen from FIGS. 1–8; it is however also possible to use other fragments for synthesizing the sequence 1–10. The tert.-butoxycarbonyl group or an equivalent group which can be removed by acid hydrolysis is preferably used as the protective group for the α-amino group on the cysteine [1], or the appropriate acyl group, for example acetyl group, is used if a Nα-acylating dotriacontapeptide is to be manufactured. At the same time, such groups are appropriately used as mercapto protective groups as can be removed selectively relative to the Nα-amino protective group which can be removed by acid hydrolysis (for example tert.-butoxycarbonyl group), for example the benzyl group or trityl group. The terminal carboxyl group of the decapeptide does not necessarily have to be protected; for example it does not have to be protected if condensations are carried out according to the azide method or anhydride method. This group can however also be protected by esterification, as indicated above, for example by esterification with methanol or ethanol (removing the ester group with dilute sodium hydroxide solution) or with benzyl alcohol or analogues (removing the ester group with, for example, sodium in liquid ammonia). The amino groups of the intermediate products are protected by means of the customary protective groups, for example carbobenzoxy, trityl, tert.-butoxycarbonyl or 2-para-diphenyl-isopropoxy-carbonyl. The carboxyl groups of the intermediate products are, if necessary, esterified in the customary manner. The hydroxyl groups of the serine and threonine radicals can be protected by etherification, for example with tert.-butanol or equivalents.

The p-nitrobenzyl ester groups and benzyl ester groups can be removed with sodium in liquid ammonia or by hydrogenolysis in the presence of palladium on charcoal, the carbobenzoxy group can also be removed by hydrogenolysis, the N-trityl group can be removed with aqueous acetic acid, the tert.-butoxycarbonyl group can be removed with trifluoracetic acid, and the 2-(p-biphenylyl)-isopropoxycarbonyl group can be removed with aqueous acetic acid or, for example, with a mixture of glacial acetic acid, formic acid (82.8% strength) and water (7:1:2). The p-nitrobenzyl ester or methyl ester can be converted into the hydrazide with hydrazine hydrate. With dilute sodium hydroxide solution, the methyl ester group or ethyl ester group are hydrolysed. The tert.-butyl ester is split with trifluoracetic acid, as is the tert.-butyl ether. The S-trityl groups are removed with mercuric acetate and hydrogen sulphide, and the S-benzyl group with sodium in liquid ammonia, with benzyl ester or p-nitrobenzyl ester groups which may be present being split off simultaneously. The cyclization to give the disulphide for example takes place by oxidation with 1,2-diiodethane, and that of the S-trityl-protected compounds with iodine in methanol.

The C-terminal sequence to be bonded to the N-terminal sequence and comprising the 11th to 32nd or 11th to 28th aminoacid is for example synthesized from the sequences 11–16, 17–20, 21–28 and 29–32, as shown by FIG. 9.

In this scheme, the hydroxyl groups of the threonine radicals and of the tyrosine radicals are protected; this is not absolutely essential. It is also possible for other partial sequences to be combined with one another and other protective groups to be used.

FIG. 10 shows the synthesis of the hexapeptide (in the form of the hydrazide) of the aminoacids 11–16. It can be linked to the sequence 17–28 or 17–32 according to the azide method.

The sequence 17–28 can be synthesized from the fragments 17–20 and 21–28 according to the azide method.

FIG. 11 shows the synthesis of the tetrapeptide-hydrazide of aminoacids 17–20 and FIG. 12 the synthesis of the octapeptide 21–28. After the two sequences have been linked, the α-amino protective group is split off (the carbobenzoxy group by hydrogenolysis in the presence of palladium on charcoal) and the dodecapeptide with protected side chains, thus obtained, is condensed according to the azide method with the hexapeptide-hydrazide 11–16 (FIG. 10).

The sequence 11–28 thus obtained can be bonded to the tetrapeptide-amide of aminoacids 29–32, of which the manufacture is shown by FIG. 13, for example according to the method of Weygand-Wünsch. The protected docosapeptide-amide 11–32 is then obtained. The α-amino protective group can be removed therefrom (carbobenzoxy for example hydrogenolytically and DPC with 90% strength acetic acid or glacial acetic acid-formic acid (82.8% strength)—water (7:1:2)), and the compound with a free α-amino group, thus obtained, can, after removal of the acetic acid, be linked to the N-terminal decapeptide (FIGS. 1–8), for example according to the method of the mixed anhydrides or the method of the activated esters (OSU), or according to Weygand-Wünsch.

It is however also possible to link the sequence 11–28, having a free C-terminal carboxyl group, after removing the α-amino protective group in the indicated manner, with the N-terminal decapeptide according to the method of the mixed anhydrides, and to condense the product thus obtained with the tetrapeptide-amide 29–32, for example according to Weygand-Wünsch.

The protective groups are removed from the protected dotriacontapeptide-amide, for example with trifluoracetic acid or with concentrated hydrochloric acid.

The dotriacontapeptide, having free or trityl-protected SH-groups, to be used for the process according to variant 2 can be manufactured in an analogous manner to the protected dotriacontapeptide described above, with the difference that the protected SH-groups are retained up to the end of the synthesis. Only after all other protective groups have been removed from the protected dotriacontapeptide are the SH-protective groups split or the trityl-protected compound oxidized directly, as mentioned above.

Depending on the procedure, the new compounds are obtained in the form of bases or of their salts. The salts can be isolated from the bases in a manner which is in itself known. From the latter, salts can in turn be obtained by reaction with acids which are suitable for the formation of therapeutically usable salts, such as for example salts with inorganic acids, such as hydrogen halide acids, for example hydrochloric acid or hydrobromic acid, perchloric acid, nitric acid or thiocyanic acid, sulphuric acids or phosphoric acids, or organic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicylic acid, 2-phenoxybenzoic acid, 2-acetoxybenzoic acid, methanesulphonic acid, ethanesulphonic acid, hydroxyethanesulphonic acid, benzenesulphonic acid, p-toluenesulphonic acid, naphthalene-sulphonic acid or sulphanilic acid.

The peptides obtained according to the process can be used in the form of pharmaceutical preparations. These contain the peptides mixed with a pharmaceutical, organic or inorganic excipient suitable for enteral or parenteral administration. Possible substances for use as the excipient are those which do not react with the polypeptides, such as for example gelatine, lactose, glucose, sodium chloride, starch, magnesium stearate, talc, vegetable oils, benzyl alcohols, gum, polyalkylene glycols, white petroleum jelly, cholesterol or other known medicinal excipients. The pharmaceutical preparations can for example be in the form of a lyophilized product or in a liquid form as solutions, suspensions or emulsions. They are optionally sterilized and/or contain auxiliary substances, such as preservatives, stabilizers, wetting agents or emulsifiers. They can also contain yet other therapeutically valuable substances.

The invention is described in the examples which follow.

The following systems are used in the thin layer chromatography:

System 37: n-Butanol-pyridine-water (46:31:23)
System 43C: Tert.amyl alcohol-isopropanol-water (51:21:28)
System 43E: Tert.-amyl alcohol-isopropanol-water (32:32:36)
System 45: Sec. butanol-3% strength aqueous ammonia (70:30)
System 52: n-Butanol-glacial acetic acid-water (75:7.5:21)
System 52A: n-Butanol-glacial acetic acid-water (67:10:23)
System 70: Ethyl acetate-pyridine-water (40:20:40)
System 79: n-Butanol-pyridine-water (77:4:19)
System 96: s.-Butanol-glacial acetic acid-water (67:10:23)

System 100: Ethyl acetate-pyridine-glacial acetic acid-water (62:21:6:11)
System 101A: n-Butanol-pyridine-glacial acetic acid-water (42:24:4:30)
System 107: Ethyl acetate-pyridine-water (49:24:27)
System 110: Ethyl acetate-n-butanol-pyridine-glacial acetic acid-water (42:21:21:6:10)
System 115: Ethyl acetate-pyridine-formic acid-water (63:21:10:6)

In the Craig distribution, the following buffer is used if not otherwise indicated: 29 ml. of glacial acetic acid and 19 g. of ammonium acetate, made up to 1 litre with water.

FIGURE 1

| | 1 Cys | 2 Gly | 3 Asn | 4 Leu | 5 Ser | 6 Thr | 7 Cys | 8 Met | 9 Leu | 10 Gly |
|---|---|---|---|---|---|---|---|---|---|---|
| A... | BOC—Bzl—OH | BOC—OH | BOC—OH | H-N₂H₂-Z | BOC—OH | H—ONB | BOC—Bzl—OH | BOC—OH | BOC—OH | H—OBzl |
| B... | | | BOC—(3)—N₂H₂-Z | | BOC—(1)-(5)—ONB | | | BOC—(1)-(5)—OBzl | | |
| C... | | | H—N₂H₂-Z | | H—ONB | | | H—OBzl | | |
| D... | | BOC—(1)-(5)—N₂H₂-Z | | | | | BOC—(1)-(5)—OBzl | | | |
| E... | | BOC—N₂H₃ | | | | | H—OBzl | | | |
| F... | | | BOC—(1)—ONB | | | | BOC—Bzl—(1)-(5)—OBzl | | | |
| G... | | | H—ONB | | | | H—Bzl—OBzl | | | |
| H... | BOC—Bzl—(1)-(5)—ONB | | | | | | | | | |
| I... | BOC—Bzl—N₂H₃ | | | | | | | | | |
| J... | BOC—Bzl—(1)—OBzl | | | | | | | | | |
| K... | BOC—SH | | | | | | SH—OH | | | |
| L... | BOC—————————————————————OH | | | | | | | | | |

FIGURE 2

| | 1 Cys | 2 Gly | 3 Asn | 4 Leu | 5 Ser | 6 Thr | 7 Cys | 8 Met | 9 Leu | 10 Gly |
|---|---|---|---|---|---|---|---|---|---|---|
| A..... | BOC—Bzl—OH | Z—OH | BOC—OH | BOC—OH | BOC—OH | H—OBzl | BOC—Bzl—OH | BOC—OH | BOC—OH | H—OBzl |
| B..... | | | | | BOC—(1)-(5)—OBzl | | | BOC—(1)-(5)—OBzl | | |
| C..... | | | | | H—OBzl | | | H—OBzl | | |
| D..... | | | | BOC—(1)-(5)—OBzl | | | | BOC—(1)-(5)—OBzl | | |
| E..... | | | | H—OBzl | | | | H—OBzl | | |
| F..... | | | BOC—(3)—OBzl | | | | BOC—Bzl—(1)-(5)—OBzl | | | |
| G..... | | | H—OBzl | | | | H—OBzl | | | |
| H..... | | Z—OBzl | | | | | | | | |
| I..... | | H—OH | | | | | | | | |
| J..... | BOC—Bzl—(3)-(5)—OH | | | | | | | | | |
| K..... | BOC—Bzl—OBzl | | | | | | Bzl—OBzl | | | |
| L..... | BOC—SH—OH | | | | | | SH—OH | | | |
| M..... | BOC—————————————————OH | | | | | | | | | |

FIGURE 3

| | 1 Cys | 2 Gly | 3 Asn | 4 Leu | 5 Ser | 6 Thr | 7 Cys | 8 Met | 9 Leu | 10 Gly |
|---|---|---|---|---|---|---|---|---|---|---|
| A... | BOC—TRI—OH | Z—OH | Z—ONP | H—OMe | DPC—tBu—OH | H—tBu—OMe | TRI—TRI—OH | BOC—OH | Z—OH | H—OMe |
| B... | | | Z—(3)—OMe | | DPC—tBu | —tBu—OMe | | Z—(1)-(5)—OMe | | |
| C... | | | H—OMe | | DPC—tBu | —tBu—N₂H₃ | | H—OMe | | |
| D... | | Z—(1)-(5)—OMe | | | | | | BOC—(1)-(5)—OMe | | |
| E... | | H—OMe | | | | | | H—OMe | | |
| F... | | | | | | | TRI—TRI—(4)—OMe | | | |
| G... | | | | | | | H—TRI—OMe | | | |
| H... | BOC—TRI—(4)—OMe | | | | DPC—tBu | tBu—(1) | TRI—OMe | | | |
| I... | BOC—TRI—N₂H₃ | | | | H—tBu | tBu | TRI—OMe | | | |
| J.... | | | | | H—tBu | tBu | TRI—OH | | | |
| K... | BOC—TRI—(1) | | | | tBu | tBu | TRI—OH | | | |
| L... | BOC—SH | | | | tBu | tBu | SH—OH | | | |
| M... | BOC—[—tBu—tBu—]—OH | | | | | | | | | |

FIGURE 4

| | 1 Cys | 2 Gly | 3 Asn | 4 Leu | 5 Ser | 6 Thr | 7 Cys | 8 Met | 9 Leu | 10 Gly |
|---|---|---|---|---|---|---|---|---|---|---|
| A... | BOC—TRI—OH | Z—OH | Z—ONP | H—OMe | DPC—tBu—OH | DPC—tBu—OH | TRI—TRI—OH | BOC—OH | Z—OH | H—OMe |
| B... | | | Z—(3)—OMe | | | | | Z—(1)-(5)—OMe | | |
| C... | | | H—OMe | | | | | H—OMe | | |
| D... | | Z—(1)-(5)—OMe | | | | | | BOC—(1)-(5)—OMe | | |
| E... | | H—OMe | | | | | | H—OMe | | |
| F... | BOC—TRI—(4)—OMe | | | | | | TRI—TRI—(5)—OMe | | | |
| G... | BOC—TRI—N₂H₃ | | | | | | H—TRI—OMe | | | |
| H... | | | | | | DPC—tBu | TRI—(1)-(5)—OMe | | | |
| I... | | | | | | H—tBu | TRI—OMe | | | |
| J.... | | | | | DPC—tBu | tBu | TRI—(1)-(5)—OMe | | | |
| K... | | | | | H—tBu | tBu | TRI—OMe | | | |
| L... | | | | | H—tBu | tBu | TRI—OH | | | |
| M... | BOC—TRI—(1) | | | | tBu | tBu | TRI—OH | | | |
| N... | BOC—[—tBu—tBu—]—OH | | | | | | | | | |

FIGURE 5

| | 1 Cys | 2 Gly | 3 Asn | 4 Leu | 5 Ser | 6 Thr | 7 Cys | 8 Met | 9 Leu | 10 Gly |
|---|---|---|---|---|---|---|---|---|---|---|
| A | TRI<br>TRI———OH | Z—OH | Z—ONP | H—OMe | tBu<br>DPC———OH | tBu<br>H———OMe | TRI<br>TRI———OH | BOC—OH | Z—H | H—OMe |
| B | | | Z———(3)———OMe | | | | | | | |
| C | | | H———————OMe | | | | | | | |
| D | | | Z———————OMe | | | | | | | |
| E | | | H———————OMe | | | | | | | |
| F | TRI<br>TRI———————(4)———————OMe | | | | | | | | | |
| G | TRI<br>H———————OMe | | | | | | | | | |
| H | TRI<br>Ac———————OMe | | | | | | | | | |
| I | TRI<br>Ac———————N₂H₃ | | | | tBu<br>H———| | tBu<br>| | TRI<br>| As in Fig. 3I or 4L———OMe | | | |
| J | TRI<br>Ac———————————————————— | | | | | tBu<br>| | tBu<br>| | TRI<br>|———OH | | |
| K | TRI<br>Ac———————————————————— | | | | | tBu<br>| | tBu<br>|———————OH | | | |

FIGURE 6

| | 1 Cys | 2 Gly | 3 Asn | 4 Leu | 5 Ser | 6 Thr | 7 Cys | 8 Met | 9 Leu | 10 Gly |
|---|---|---|---|---|---|---|---|---|---|---|
| A | TRI<br>BOC———OH | Z—OH | Z—ONP | H—OMe | tBu<br>DPC———OH | tBu<br>H———OMe | TRI<br>TRI———OMe | BOC—OH | BOC—OH | H—OMe |
| B | | | | | tBu<br>DPC———(1)-(5) | tBU<br>|———OMe | TRI<br>H———OMe | BOC———(1)-(5)———OMe | | |
| C | | | | | tBu<br>DPC———| | tBu<br>|———N₂H₃ | | H———————OMe | | |
| D | | | | | tBu<br>DPC———| | tBu<br>| | TRI<br>(1)———OMe | BOC———(1)-(5)———OMe<br>BOC———————————OH | | |
| E | | | | | tBu<br>DPC———| | tBu<br>| | TRI<br>|———OH | H———————OH | | |
| F | TRI<br>BOC———| As in Fig. 4G———N₂H₃ | | | | tBu<br>H———| | tBu<br>| | TRI<br>|———OH | | | |
| G | TRI<br>BOC———(1)———————————— | | | | tBu<br>| | tBu<br>| | TRI<br>|———OH | | | |
| H | TRI<br>BOC———————————————— | | | | | tBu<br>| | tBu<br>|———OH | | | |
| I | BOC———————————————————— | | | | | tBu<br>| | tBu<br>|———————(3)———————OH | | | |

FIGURE 7

| | 1<br>Cys | 2<br>Gly | 3<br>Asn | 4<br>Leu | 5<br>Ser | 6<br>Thr | 7<br>Cys | 8<br>Met | 9<br>Leu | 10<br>Gly |
|---|---|---|---|---|---|---|---|---|---|---|
| A... | BOC—[Bzl]—OSU | BOC—ONP | BOC—OH | BOC—ONP | BOC—OH | H—OBzl | H—[Bzl]—OBzl | BOC—N₂H₃ | Z— | —OEt |
| B... | | | | | BOC——(2)(4)(5)——OBzl | | | | H— | —OEt |
| C... | | | | | H——————OBzl | | | BOC———(1)——— | | —OEt |
| D... | | | | BOC————(3)————OBzl | | | | BOC——————— | | —OH |
| E... | | | | H——————————OBzl | | | | H——————— | | —OH |
| F... | | | BOC————(2)(4)(5)————OBzl | | | | | | | |
| G... | | | H——————————————OBzl | | | | | | | |
| H... | | BOC——————(3)——————OBzl | | | | | | | | |
| I... | | BOC——————————————OH | | | | | | | | |
| J... | | BOC————————(2)(5)————————H—[Bzl]—OBzl | | | | | | | | |
| K... | | H————————————————H—[Bzl]—OBzl | | | | | | | | |
| L... | BOC—[Bzl]————————(3)————————H—[Bzl]—OBzl | | | | | | | | | |
| M... | BOC————————————————————OH | | | | | | | | | |
| N... | BOC—[————————————————]—OH | | | | | | | | | |
| O... | BOC—[————————————————]———(2)———OH | | | | | | | | | |

FIGURE 8

| | 1<br>Cys | 2<br>Gly | 3<br>Asn | 4<br>Leu | 5<br>Ser | 6<br>Thr | 7<br>Cys | 8<br>Met | 9<br>Leu | 10<br>Gly |
|---|---|---|---|---|---|---|---|---|---|---|
| A... | BOC—[Bzl]—OSU | BOC—ONP | BOC—OH | BOC—ONP | BOC—OH | H—OBzl | H—[Bzl]—N₂H₂Z | BOC—N₂H₃ | Z— | —OEt |
| B... | | | | | BOC——(2)(4)(5)——OBzl | | | | H— | —OEt |
| C... | | | | | H——————OBzl | | | BOC——————— | | —OEt |
| D... | | | | BOC————(3)————OBzl | | | | BOC——————— | | —OH |
| E... | | | | H——————————OBzl | | | | H——————— | | —OH |
| F... | | | BOC————(2)(4)(5)————OBzl | | | | | | | |
| G... | | | H——————————————OBzl | | | | | | | |
| H... | | BOC——————(3)——————OBzl | | | | | | | | |
| I... | | BOC——————————————OH | | | | | | | | |
| J... | | BOC————————(2)(5)————————[Bzl]—N₂H₂—Z | | | | | | | | |
| K... | | H————————————————[Bzl]—N₂H₂—Z | | | | | | | | |
| L... | BOC—[Bzl]————————————————[Bzl]—N₂H₂—Z | | | | | | | | | |
| M... | BOC————————————————————N₂H₃ | | | | | | | | | |
| N... | BOC—[————————————————]—N₂H₃ | | | | | | | | | |
| O... | BOC—[————————————————]———(1)———OH | | | | | | | | | |

FIGURE 9

| 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|
| Thr | Tyr | Thr | Gln | Asp | Phe | His | Lys | Leu | Gln | Thr | Phe | Pro | Gln | Thr | Ala | Ile | Gly | Val | Gly | Ala | Pro | |
| | | | | | | | | | | | Z—tBu—OH | | H—tBu—OMe | | | | | | OH | | | |
| | | | | | | | | | | | Z—tBu————————(2)————————OH | | | | | | | | | | | |
| | | | | | | | BOC | | | | | | | | | | | | | | | |
| | | | | | | | Z—BOC————N₂H₃ H—tBu—————tBu—————OH | | | | | | | | | | | | | | |
| | | | | | | | Z—BOC——(1)——————tBu—————tBu—————OH | | | | | | | | | | | | | | |
| Z/DPC—tBu—tBu—tBu—tBu—N₂H₃ H—BOC——————tBu—————tBu—————OH | | | | | | | | | | | | | | | | | | | | | | |
| Z/DPC—tBu—tBu—tBu—tBu——(1)——BOC——————tBu—————tBu—————OH H——NH₂ | | | | | | | | | | | | | | | | | | | | | | |
| Z/DPC—tBu—tBu—tBu—tBu———————BOC——————tBu—————tBu————(4)(5)——NH₂ | | | | | | | | | | | | | | | | | | | | | | |
| H—tBu—tBu—tBu—tBu———————BOC——————tBu—————tBu——————————NH₂ | | | | | | | | | | | | | | | | | | | | | | |

FIGURE 10

| | 11 Thr | 12 Tyr | 13 Thr | 14 Gln | 15 Asp | 16 Phe |
|---|---|---|---|---|---|---|
| A | Z/DPC}—tBu—OH | Z—tBu—OH | Z—tBu—OH | Z—ONP | Z—OtBu—ONP | H—OMe |
| B | | | | | Z—OtBu——(3)——OMe | |
| C | | | | | H—OtBu——————OMe | |
| D | | | | Z——(3)— | OtBu——————OMe | |
| E | | | | H— | OtBu——————OMe | |
| F | | | | Z—tBu—(3)— | OtBu——————OMe | |
| G | | | | H—tBu— | OtBu——————OMe | |
| H | | Z—tBu— | tBu— | | OtBu——————OMe | |
| I | | H—tBu— | tBu— | | OtBu——————OMe | |
| J | Z/DPC}—tBu— | tBu— | tBu— | | OtBu——————OMe | |
| K | Z/DPC}—tBu— | tBu— | tBu— | | OtBu——————N₂H₃ | |

FIGURE 11

| | 17 His | 18 Lys | 19 Leu | 20 Gln |
|---|---|---|---|---|
| A | Z—N₂H₃ | BOC Z———OH | H—OMe | H—OMe |
| B | | BOC Z———(2)———OMe | | |
| C | | BOC Z———————————N₂H₃ | | |
| D | | BOC Z———(1)———OMe | | |
| E | | BOC H———————————OMe | | |
| F | | BOC Z———(1)———OMe | | |
| G | | BOC Z———————————N₂H₃ | | |

FIGURE 12

| | 21 Thr | 22 Phe | 23 Pro | 24 Gln | 25 Thr | 26 Ala | 27 Ile | 28 Gly |
|---|---|---|---|---|---|---|---|---|
| A | tBu Z——OH | Z——OH | Z—ONP | | tBu Z——OH | Z—ONP | Z—OH | H—OMe |
| B | | H——OH | | | | Z——(1)-(5)——OMe | | |
| C | tBu Z——(2)——OH | | | | | H————OMe | | |
| D | | | | | | Z——(3)——OMe | | |
| E | | | | | | H————OMe | | |
| F | | | | | tBu Z——(2)——OMe | | | |
| G | | | | | tBu H————OMe | | | |
| H | | | | | tBu H————OH | | | |
| I | | | | | tBu Z——(3)——OH | | | |
| J | | | | | tBu H————OH | | | |
| K | tBu Z——(2) | | | | tBu ————OH | | | |
| L | tBu ———— | | | | tBu ————OH | | | |

FIGURE 13

| | 29 Val | 30 Gly | 31 Ala | 32 Pro |
|---|---|---|---|---|
| A | Z—ONP | Z—OH | Z—ONP | H—NH₂ |
| B | | | Z——(3)——NH₂ | |
| C | | | H————NH₂ | |
| D | | Z——(1)-(5)——NH₂ | | |
| E | | H————————NH₂ | | |
| F | Z——(3)——————————NH₂ | | | |
| G | H————————————————NH₂ | | | |

EXAMPLE 1

H-Cys-Gly-Asn-Leu-Ser-Thr-Cys-Met-Leu-Gly-Thr-Tyr-Thr-Gln-Asp-Phe-Asn-Lys-Phe-His-Thr-Tyr-Pro-Gln-Thr-Ala-Ile-Gly-Val-Gly-Ala-Pro-NH₂.Tyr²²-calcitonin M 50 mg. of BOC-Cys-Gly-Asn-Leu-Ser(tBu)-Thr(tBu)-Cys-Met-Leu-Gly-Thr(tBu)Tyr(tBu)-Thr(tBu) Gln-Asp(OtBu)-Phe-Asn-Lys(BOC)-Phe-His-Thr(tBu)-Tyr(tBu)-Pro-Gln-Thr(tBu)-Ala-Ile-Gly-Val-Gly-Ala-Pro-NH₂ are dissolved in 1.2 ml. of concentrated hydrochloric acid at 0° C., and the solution is flushed with nitrogen and left to stand for 10 minutes at 0° C. It is then cooled with solid carbon dioxide and subjected to a high vacuum, and the solution is concentrated to a syrup with a slow increase in temperature up to 0° C. After addition of 2 ml. of water the product is lyophilized, the residue is dissolved in 1 ml. of water and slowly filtered through a column (diameter=7.5 mm.; 1=100 mm.) of weakly basic ion exchanger (Merck No. II), equilibrated with 0.02 N acetic acid, in order to convert the product into the acetate. The column is rinsed with 0.02 N acetic acid until it gives a negative Folin reaction, and the eluate is concentrated to approx. 2 ml. and lyophilized. The product thus obtained (acetate of Tyr²²-calcitonine M) is equilibrated with atmospheric moisture by allowing it to stand in an open vessel. It is an amorphous, white powder. In thin layer chromatography on aluminum oxide (Alox D-O of Messrs. Camag, Muttenz, with the addition of 12% of gypsum) it shows the following Rf-values: $Rf_{52}=0.48$, $Rf_{79}=0.60$.

In thin layer electrophoresis on cellulose ("Avicel" ready-to-use plates 1440 of Messrs. Schleicher and Schuell) it migrates 3.7 cm. towards the cathode in 1½ hours at pH 1.9 [buffer of 95.2 ml. of glacial acetic acid, 26.5 ml. of formic acid and 1000 ml. of water] and 16 volts/cm. The protected dotriacontapeptide-amide is for example manufactured as follows:

Z-Tyr(tBu)-OH, in tetrahydrofurane solution, is reacted with isobutyl chlorocarbonate to give the mixed anhydride and this is condensed with proline-triethylammonium salt (dissolved in dimethylformamide-water (4:1)) to give the dipeptide. This is hydrogenated in methanol using palladium on charcoal, and reacted with Z-Thr(tBu)-OSU in dimethylformamide solutions to give the tripeptide Z-Thr(tBu)-Tyr(tBu)-Pro-OH, and this is in turn condensed, via the mixed anhydride with isobutyl chlorocarbonate, with H-Gln-Thr(tBu)-Ala-Ile-Gly-OH·HCl (manufactured by condensation of H-Ile-Gly-OMe with Z-Ala-ONP in dimethylformamide, hydrogenation of the resulting protected tripeptide methyl ester in methanol by means of palladium on charcoal, condensation of the H-Ala-Ile-Gly-OMe thus obtained with Z-Thr(tBu)-OSU in dimethylformamide, hydrogenation of the carbobenzoxy compound in methanol by means of palladium on charcoal to give H-Thr(tBu)-Ala-Ile-Gly-OMe, saponification of the ester in methanol with 1 N sodium hydroxide solution, condensation of the H-Thr(tBu)-Ala-Ile-Gly-OH with Z-Gln-ONP in dimethylformamide and hydrogenation of Z-Gln-Thr(tBu)-Ala-Ile-Gly-OH in 80% strength aqueous methanol containing hydrochloric acid, in the presence of palladium on charcoal) to give Z-Thr(tBu)-Tyr(tBu)-Pro-Gln-Thr(tBu)-Ala-Ile-Gly-OH. The carbobenzoxy group is removed by catalytic hydrogenation in 80% strength acetic acid and the partially protected octapeptide thus obtained is reacted, in 90% strength dimethylformamide, with a freshly prepared solution of Z-Asn-Lys(BOC)-Phe-His-N₃ in dimethylformamide (manufactured by condensation of Z-Lys(BOC)-ONP with H-Phe-OMe in dimethylformamide, reaction of the Z-Lys(BOC)-Phe-OMe with hydrazine hydrate to give the hydrazide, conversion of the hydrazide into the azide with tert.-butyl nitrite and condensation with H-His-OMe, hydrogenation of the resulting Z-Lys(BOC)-Phe-His-OMe in methanol by means of palladium on charcoal, condensation of the resulting H-Lys(BOC)-Phe-His-OMe with Z-Asn-ONP in dimethylformamide, conversion of the Z-Asn-Lys(BOC)-Phe-His-OMe into the hydrazide with hydrazine hydrate in methanol and conversion of the hydrazide to the azide with sodium nitrite and hydrochloric acid in dimethylformamide) to give the dodecapeptide Z-Ans-Lys(BOC)-Phe-His-Thr(tBu)-Tyr(tBu)-Pro-Gln-Thr(tBu)-Ala-Ile-Gly-OH. After catalytic hydrogenation in 80% strength acetic acid, the dodecapeptide is condensed, in dimethylformamide solution, with Z-Thr(tBu)-Tyr(tBu)-Thr(tBu)-Glen-Asp(OtBu)-Phe-N₃ (manufactured by condensation of Z-Asp(OtBu)-ONP with H-Phe-OMe in dimethylformamide, hydrogenation of the Z-Asp(OtBu)-Phe-OMe in methanol with the addition of hydrogen chloride in dioxane and in the presence of palladium on charcoal, condensation of the resulting H-Asp(OtBu)-Phe-OMe·HCl with Z-Gln-ONP in dimethylformamide and triethylamine, hydrogenation of the Z-Gln-Asp(OtBu)-Phe-OMe in methanol with the addition of hydrogen chloride in dioxane, and in the presence of palladium on charcoal, condensation of the resulting H-Gln-Asp(OtBu)-Phe-OMe in methylene chloride with Z-Thr(tBu)-OH in the presence of dicyclohexylcarbodiimide, hydrogenation of the Z-Thr(tBu)-Gln-Asp(OtBu)-Phe-OMe in methanol by means of palladium on charcoal, condensation of the H-Thr(tBu)-Gln-Asp(OtBu)-Phe-OMe with Z-Tyr(tBu)-OH in acetonitrile in the presence of dicyclohexylcarbodiimide, hydrogenation of the Z-Tyr(tBu)-Thr(tBu)-Gln-Asp OtBu)-Phe-OMe in dimethylformamide in the presence of palladium on charcoal, condensation of the H-Tyr(tBu)-Thr(tBu)-Gln-Asp(OtBu)-Phe-OMe in acetonitrile with Z-Thr(tBu)-OH in the presence of dicyclohexylcarbodiimide, conversion of the resulting Z-Thr(tBu)-Tyr(tBu)-Thr(tBu)-Glen-Asp(OtBu)-Phe-OMe into the hydrazide with hydrazine hydrate in methanol and reaction of the hydrazide, in dimethylformamide, with sodium nitrite and 3 N hydrochloric acid to give the azide), and the resulting Z-Thr(tBu)-Tyr(tBu)-Thr(tBu)-Gln-Asp(OtBu)-Phe-Asn-Lys(BOC)-Phe-His-Thr(tBu)-Tyr(tBu)-Pro-Gln-Thr(tBu)-Ala-Ile-Gly-OH is reacted with H-Val-Gly-Ala-Pro-NH₂ (manufactured by condensation of H-Pro-NH₂ with Z-Ala-ONP in dimethylformamide, hydrogenation of the resulting Z-Ala-Pro-NH₂ in aqueous ethanol containing hydrochloric acid, in the presence of palladium on charcoal, condensation with Z-Gly-ONP in dimethylformamide, hydrogenation of the resulting Z-Gly-Ala-Pro-NH₂ in dimethylformamide in the presence of palladium on charcoal, condensation of H-Gly-Ala-Pro-NH₂ with Z-Val-ONP in dimethylformamide and hydrogenation of the Z-Val-Gly-Ala-Pro-NH₂ in 80% strength methanol in the presence of palladium on charcoal), by means of dicyclohexylcarbodiimide and N-hydroxysuccinimide, in dimethylformamide, to give the completely protected docosapeptide-amide. This compound is purified with the aid of a Craig distribution in the solvent system methanol-buffer-chloroform-carbon tetrachloride (10:3:5:6) and is subsequently hydrogenated in 80% strength acetic acid. On dissolving in methanol and adding dropwise to an 0.1 N aqueous sodium carbonate solution, the acetate-free form is obtained, which is condensed with $\overline{\text{BOC-Cys-Gly-Asn-Leu-Ser(tBu)-Thr(tBu)-Cys}}$-Met-Leu-Gly-OH by means of dicyclohexylcarbodiimide and N-hydroxysuccinimide, to give the completely protected dotriacontapeptide-amide. This compound is purified in a Craig distribution in the system methanol-buffer-chloroform-carbon tetrachloride (11:3:6:7).

Advantageously, the protected docosapeptide-amide is manufactured as follows:

(1)          Z-Tyr(tBu)-Pro-OH 12.95 g. of Z-Tyr(tBu)-OH are dissolved in 130 ml. of absolute tetrahydrofurane, 3.86 ml. of N-methylmorpholine are added, the solution is cooled to —22° C. and 4.79 ml. of chloroformic acid isobutyl ester are added dropwise over the course of 4 minutes. The resulting cloudy solution is stirred for 30 minutes at —10° C. and thereafter cooled to —30° C., a solution of 6.03 g. of proline in 110 ml. of 80% strength dimethylformamide is added and the resulting clear solution is left to stand for 30 minutes at —10° C., 2 hours at 0° C. and 13 hours at room temperature. The clear, yellow solution is evaporated, and the dark yellow oil is dissolved in ethyl acetate and washed four times with dilute, aqueous citric acid solution and also with water until the wash water reacts neutral. The ethyl acetate phase is dried over sodium sulphate. The resulting white foam shows the following $R_f$-values in the thin layer chromatogram on silica gel: $Rf_{115}=0.78$, $Rf_{45}=0.40$ and $Rf_{43C}=0.37$.

(2)          H-Tyr(tBu)-Pro-OH 11.75 g. of Z-Tyr(tBu)-Pro-OH are dissolved in 118 ml. of methanol and hydrogenated with hydrogen at room temperature with the addition of 2.35 g. of palladium on charcoal (10% Pd). After the hydrogen absorption has ceased, the mixture is filtered, the filtrate is evaporated and the resulting oil is immediately processed further.

(3)          Z-Thr(tBu)-Tyr(tBu)-Pro-OH

The oil obtained under (2) is dissolved in 39 ml. of dimethylformamide, the clear solution is cooled in an ice bath, and 2.81 ml. of N-methylmorpholine as well as 12.2 g. of solid Z-Thr(tBu)OSU are added. The resulting solution is left to stand for 23 hours at room temperature and is evaporated, the resulting yellow-brown oil is dissolved in ethyl acetate, and the solution is washed three times with dilute citric acid solution, and then with water until the wash water reacts neutral. The ethyl acetate phase is dried by means of sodium sulphate and then evaporated. A white foam is obtained, which is subject to a Craig countercurrent distribution: 16.5 g. of the product are distributed over the first five tubes of a distribution apparatus (phase volumes 20 ml. each), with the solvent system methanolwater-chloroform-carbon tetrachloride (4:1:1:3) being used. A multiplicative distribution over 836 stages ($r_{max}=128$, $K=0.18$) is carried out. The resulting pure fractions (distribution elements No. 120-135) are evaporated under a waterpump vacuum at 40° C. bath temperature and the residue is dried at 40° C. under a high vacuum. Melting point: 90-94° C., $$[\alpha]_D^{20} = -23°$$

(c.=1 in methanol). In a thin layer chromatogram on silica gel, $Rf_{115}=0.79$; $Rf_{100}=0.84$; $Rf_{52}=0.87$.

(4) H-Gln-Thr(tBu)-Ala-Ile-Gly-OMe 4.97 g. of Z-Gln-Thr(tBu)-Ala-Ile-Gly-OMe (compare Belgian Pat. 737,890), are suspended in 107 ml. of 80% strength t-butanol and hydrogenated with hydrogen, with the addition of 1.0 g. of palladium on charcoal (10% Pd) initially for 2 hours at room temperature and then at 40° C. until hydrogen absorption has ceased. The mixture is then filtered, the filtrate is evaporated, and the yellowish-red oil is dissolved in t-butanol and lyophilized. The resulting white powder shows a melting point of 243-244° C.; in a thin layer chromatogram on silica gel, $Rf_{100}=0.30$ and $Rf_{115}=0.44$.

(5) Z-Thr(tBu)-Tyr(tBu)-Pro-Gln-Thr(tBu)-Ala-Ile-Gly-OMe 4.94 g. of Z-Thr(tBu)-Tyr(tBu)-Pro-OH are dissolved in 40 ml. of dimethylformamide, 3.95 g. of H-Gln-Thr-(tBu)-Ala-Ile-Gly-OMe and 1.07 g. of N-hydroxysuccinimide are added, the resulting solution is cooled to 0° C. in an ice bath, and 2.07 g. of solid dicyclohexylcarbodiimide are added. The solution is left to stand for 15 hours at room temperature, dicyclohexylurea which has precipitated is filtered off, the filtrate is mixed with water, and the resulting precipitate is filtered off. The latter is washed with ether and then reprecipitated from methanol-ethyl acetate-petroleum ether. A powder of melting point: 187-188° C. is obtained; which is a single substance according to a thin layer chromatogram; in a thin layer chromatogram on silica gel, $Rf_{100}=0.90$; $Rf_{45}=0.78$ and $Rf_{115}=0.70$.

(6) Z-Thr(tBu)-Tyr(tBu)-Pro-Gln-Thr(tBu)-Ala-Ile-Gly-Oh x H$_2$O 6.43 g. of the protected octapeptide methyl ester obtained under (5) are dissolved in 110 ml. of 90% strength methanol, 16.53 ml. of 1 N sodium hydroxide solution are rapidly added dropwise at room temperature with vigorous stirring, and the mixture is then stirred for a further 10 minutes at room temperature. 92 ml. of water are added to the solution, the mixture is filtered, and the filtrate is added to 390 ml. of previously introduced 0.05 N-hydrochloric acid which have been cooled with ice. The suspension is stirred for 3 hours at 0° C. and filtered off, and the filter residue is washed with water until free of chloride. A white powder of melting point: 224-225° C., $[\alpha]_D^{20}=-54°$ (c.=1 in methanol) is obtained, which is a single substances according to a thin layer chromatogram.

In a thin layer chromatogram on silica gel, $Rf_{100}=0.67$, $Rf_{45}=0.38$ and $Rf_{115}=0.67$.

(7) H-Thr(tBu)-Tyr(tBu)-Pro-Gln-Thr(tBu)-Ala-Ile-Gly-OH x CH$_3$COOH 1.30 g. of the product described under (6) are dissolved in 40 ml. of 80% strength acetic acid and hydrogenated at room temperature by means of hydrogen, with the addition of 75 mg. of palladium on charcoal (10% strength). The mixture is filtered, the filtrate, is concentrated to half, glacial acetic acid is added and the product is lyophilized. The lyophilized product is dissolved in 80% strength t-butanol, again lyophilized and further dried in a high vacuum at 40° C. The resulting white powder shows the following Rf-values in a thin layer chromatogram: $Rf_{70}=0.37$; $Rf_{100}=0.21$; in the system isopropanol-concentrated ammonia (9:1), $Rf=0.36$.

(8) Z-Asn-Lys(BOC)-Phe-His-Thr(tBu)-Tyr(tBu)-Pro-Gln-Thr(tBu)-Ala-Ile-Gly-OH 1.34 g. of Z-Asn-Lys(BOC)-Phe-His-NHNH$_2$ (compare Belgian Pat. 737,890) are dissolved in 6.2 ml. of dimethylformamide, the solution is cooled to —20° C., and 1.40 ml. of 3.0 N HCl in dioxane as well as 0.252 ml. of t-butyl nitrite are added. The solution is left to stand for 15 minutes at —15° C., 0.724 ml. of N-ethyldiisopropylamine are added, the mixture is then cooled to —20° C., and a solution of 1.12 g. of H-Thr(tBu)-Tyr(tBu)-Pro-Gln-Thr(tBu)-Ala-Ile-Gly-OH in 24 ml. of dimethylformamide is added. The solution is left to stand for 16 hours at +5° C. and is then largely evaporated, and ether is added. The resulting precipitate is twice kneaded with ether. The resulting powder is filtered off, washed with water until free of chloride, dissolved in 70% strength acetonitrile and again precipitated by adding 100% strength acetonitrile. For further purification, it is subjected to a Craig counter-current distribution. For this purpose, 1.72 g. of the product are distributed over the first three tubes of a distribution apparatus (phase volumes 10 ml. each), with the solvent system methanol-buffer-chloroform-carbon tetrachloride 10:3:5:4 (buffer:28.6 ml. of glacial acetic acid and 19.25 g. of ammonium acetate are dissolved in 960 ml. of water) being used. A multiplicative distribution over 200 stages is carried out ($r_{max}=1.90$, $K=19$). The ammonium acetate is sublimed off the resulting pure fractions (distribution elements No. 174-200) in a high vacuum at 40° C. The protected docosapeptide is obtained.

In a thin layer chromatogram on silica gel, $Rf_{70}=0.46$ and $Rf_{100}=0.29$, and in the system isopropanol concentrated ammonia (9:1), $Rf=0.32$.

(9) H-Asn-Lys(BOC)-Phe-His-Thr(tBu)-Tyr(tBu)-Pro-Gln-Thr(tBu)-Ala-Ile-Gly-OH 930 mg. of the product obtained under (8) are dissolved in 110 ml. of 80% strength acetic acid and hydrogenated at room temperature by means of hydrogen, with the addition of 100 mg. of palladium on charcoal (10%) Pd). The mixture is filtered, the filtrate is largely evaporated, glacial acetic acid is added to the residue and the product is lyophilized. The resulting product is dissolved in 70% strength t-butanol, again lyophilized and further dried at 40° C. under a high vacuum.

(10) Z-Thr(tBu) - Tyr(tBu)-Thr(tBu)-Gln-Asp(OtBu)-Phe-Asn-Lys(BOC) - Phe - His - Thr(tBu)-Tyr(tBu)-Pro-Gln-Thr(tBu)-Ala-Ile-Gly-OH 770 mg. of Z-Thr(tBu)-Tyr(tBu)-Thr(tBu)-Gln-Asp-(OtBu)-Phe-NHNH$_2$ (compare Belgian Pat. 737,890) are dissolved in 3.2 ml. of dimethylformamide, the slightly cloudy solution is cooled to —20° C., and 588 μl. of 3.0 N hydrochloric acid in dioxane as well as 98 μl. of t-butyl nitrite are added. The solution is left to stand for 15 minutes at —15° C., a solution of 778 mg. of the product described under (9) in 14 ml. of dimethylformamide and 0.303 ml. of N-ethyldiisopropylamine is then added, and the resulting solution is stirred for 5½ hours whilst cooling with ice. During this time, 0.076 ml. of N-ethyldiisopropylamine is added in six portions. The solution is left to stand for 15 hours at +5° C. and then added dropwise to ether, and the resulting white precipitate is dissolved in dimethylformamide and the solution is added dropwise to 0.02 N hydrochloric acid cooled to 0° C. (to which 10 ml. of saturated sodium chloride solution are added per 100 ml. volume). The product thereby obtained is dissolved in 80% strength acetonitrile and precipitated at 50° C. by means of water. For further purification, the product is reprecipitated from dimethylformamide-ether and from acetonitrile-water.

In a thin layer chromatogram on silica gel, $Rf_{100}=0.50$ and $Rf_{70}=0.63$.

25

(11) Z-Thr(tBu) - Tyr(tBu)-Thr(tBu)-Gln-Asp(OtBu)-Phe-Asn-Lys(BOC) - Phe - His - Thr(tBu)-Tyr(tBu)-Pro-Gln-Thr(tBu)-Ala-Ile-Gly-Val-Gly-Ala-Pro-NH₂

755 mg. of the product described under (10) are dissolved in 8 ml. of dimethylformamide, 139 mg. of H-Val-Gly-Ala-Pro-NH₂ (compare Belgian Pat. 737,890), 47 mg. of N-hydroxy-succinimide and 84 mg. of dicyclohexylcarbodiimide are added to the solution at room temperature, and the mixture is stirred for 18 hours at 45° C. The solution is subsequently added dropwise to ether and the white powder which precipitates is subjected to a Craig counter-current distribution: 844 mg. of the docosapeptide-amide are distributed over the first five tubes of a distribution apparatus (phase volumes 3 ml. each), with the solvent system methanol-buffer-chloroform-carbon tetrachloride, 10:3:5:6 (buffer as under (8)) being used. A multiplicative distribution over 400 stages ($r_{max}$=133, K=0.5) is carried out. The ammonium acetate is sublimed off the resulting pure fractions at 40° C. under a high vacuum; the pure, protected docosapeptide-amide shows $Rf_{100}$=0.46 in a thin layer chromatogram on silica gel.

(12) H-Thr(tBu) - Tyr(tBu)-Thr(tBu)-Gln-Asp(OtBu)-Phe-Asn-Lys(BOC) - Phe - His - Thr(tBu)-Tyr(tBu)-Pro-Gln-Thr(tBu)-Ala-Ile-Gly-Val-Gly-Ala-Pro-NH₂

233 mg. of the product described under (11) are dissolved in 24 ml. of 80% strength acetic acid and hydrogenated for 18 hours at room temperature with hydrogen, with the addition of 40 mg. of palladium on charcoal (10% Pd). The mixture is then filtered, the filtrate is evaporated almost to dryness, the residue is dissolved in glacial acetic acid and the product is lyophilized. The resulting lyophilized product is dissolved in a little methanol, and the solution is adjusted to a pH-value of between 7 and 8 with saturated sodium hydrogen carbonate solution and then added dropwise to an 0.1 N sodium carbonate solution. A white powder is obtained, which in a thin layer chromatogram on silica gel shows $Rf_{100}$=0.34; $Rf_{70}$=0.67 and $Rf_{43E}$=0.57.

(13) BOC-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys(BOC)-Phe-His-Thr(tBu)-Tyr(tBu)-Pro-Gln-Thr(tBu)-Ala-Ile-Gly-Val-Gly-Ala-Pro-NH₂

171 mg. of the docosapeptide-amide described under (12) and 83.5 mg. of the protected decapeptide BOC-Cys-Gly-Asn-Leu-Ser(tBu) - Thr(tBu) - Cys - Met-Leu-Gly-OH are dissolved in 1.16 ml. of warm dimethylformamide, 15.9 mg. of solid N-hydroxy-succinimide and 21.4 mg. of dicyclohexylcarbodiimide are then added at room temperature, and the mixture is stirred for 3½ hours at 45° C. Thereafter the solution is added dropwise to 23 ml. of peroxide-free ether and the white powder obtained as a precipitate is purified by subjecting it to a Craig counter-current distribution: 234 mg. of the product are distributed over the first four tubes of a distribution apparatus (phase volumes 3 ml. each), with the solvent system methanol-buffer-chloroform-carbon tetrachloride, 11:3:6:7 (buffer as under (8)) being used. A multiplicative distribution over a total of 260 steps ($r_{max}$=60, K=0.3) is carried out. The ammonium acetate is sublimed off the resulting pure fractions at 40° C. under a high vacuum; the protected dotriacontapeptide-amide shows $Rf_{70}$=0.32 and $Rf_{100}$=0.48 in a thin layer chromatogram on silica gel.

The

BOC-Cys-Gly-Asn-Leu-Ser(tBu)-Thr(tBu)-Cys-Met-Leu-GlyOH can be manufactured as follows (compare Belgian Pat. 737,890):

(1) Z-Asn-Leu-OMe 16.7 g. of H-Leu-OMe and 46.0 g. of Z-Asn-ONP are dissolved in 100 ml. of freshly distilled dimethylformamide. The solution is left to stand for 19 hours at 25° C.

26

Thereafter 1.2 litres of water are added and the crystalline precipitate is filtered off. The dipeptide derivative is dried at 40° C. in vacuo and is then twice recrystallized from methanol-water. Melting point 180–181° C.; $[\alpha]_D^{20}$=+9° (c.=0.25 in chloroform).

(2) H-Asn-Leu-OMe 15.0 g. of Z-Asn-Leu-OMe are dissolved in 400 ml. of t-butanol-water (9:1) and hydrogenated in the presence of 2 g. of palladium on charcoal (10% Pd). After completion of the hydrogenation, the catalyst is filtered off and the filtrate is evaporated at 40° C. The residue is directly used further.

(3) Z-Gly-Asn-Leu-OMe 4.4 mmols of H-Asn-Leu-OMe are dissolved in 15 ml. of dimethylformamide and 5.5 mmols of Z-Gly-p-nitrophenyl ester are then added. The clear, yellow solution is left at 27° C. for 18 hours. It is then evaporated under a high vacuum at 40° C. dried, and the residue is mixed with ethyl acetate, whereupon it crystallizes. After 1 hour at 0° C. the product is filtered off and dried. The product is then again suspended in 25 ml. of ethyl acetate, triturated, filtered off and dried; melting point 159° C.

(4) H-Gly-Asn-Leu-OMe 2.0 g. of Z-Gly-Asn-Leu-OMe are dissolved in 20 ml. of methanol, with warming, and hydrogenated with 200 mg. of palladium on charcoal (10% Pd) until the absorption of hydrogen has ceased. The catalyst is filtered off and the filtrate is evaporated to dryness at 40° C. bath temperature, whereby the tripeptide methyl ester is directly obtained in a crystalline, pure form (1.34 g.; melting point 138–139° C.).

(5) BOC-Cys-(TRI)-Gly-Asn-Leu-OMe 5.7 g. of H-Gly-Asn-Leu-OMe, 9.2 g. of BOC-Cys-(TRI)-OH and 4.16 g. of N-hydroxysuccinimide are dissolved in 200 ml. of dimethylformamide, cooled to 0° C. and mixed with 5.57 g. of dicyclohexylcarbodiimide, in the solid form, whilst stirring. The mixture is stirred for a further hour at 0° C., then left to stand overnight at approx. 20° C. and concentrated in a high vacuum to a volume of approx. 100 ml., and the dicyclohexylurea which has separated out is filtered off. The filtrate is then concentrated further in a high vacuum until a sticky mass is formed, this is dissolved in 200 ml. of n-butanol, and the solution is successively washed with water, 5% strength tartaric acid solution, 1 N sodium bicarbonate and again with water. The solution is now concentrated to a volume of approx. 50 ml. and the tetrapeptide derivative is precipitated therefrom by adding 300 ml. of petroleum ether. The product is purified by reprecipitation from dimethylformamide-water and from methanol-ethyl acetate-petroleum ether, and the tetrapeptide derivative is thus obtained as an amorphous powder of melting point 145–148° C. It shows the following Rf values in a thin layer chromatogram on silica gel: $Rf_{115}$=0.68; Rf (acetone) =0.59; Rf (chloroform-methanol, 8:2)=0.60.

(6) BOC-Cys-(TRI)-Gly-Asn-Leu-NHNH₂

2.7 g. of BOC-Cys(TRI)-Gly-Asn-Leu-OMe are dissolved in 22 ml. of methanol and the solution is cooled to 0° C. and mixed with 2.2 ml. of hydrazine hydrate. After approx. 30 minutes at 0° C., the solution is left to stand overnight at approx. 20° C., again cooled to 0° C. and then mixed with 102 ml. of 3% strength ice-cold acetic acid. The precipitate is thoroughly homogenized, filtered off and washed on the filter with ice-cold, 3% strength acetic acid until the wash liquid gives a negative Folin reaction, and is subsequently dried. 2.2 g. of chromatographically pure tetrapeptide-hydrazide of decomposition point approx. 195° C. are obtained. This material shows the following Rf values in a thin layer chromatogram on silica gel: Rf (chloroform-methanol, 8:2)=0.30; Rf (acetone-methanol, 9:1)=0.53.

(7) BOC-Met-Leu-Gly-OMe 6.72 g. of Z-Leu-Gly-OMe in 50 ml. of methanol are hydrogenated by means of 500 mg. of palladium on charcoal (10% Pd) until the absorption of hydrogen has ceased. The solution is freed of the catalyst by filtration and concentrated to approx. 10 ml. in vacuo, diluted with 30 ml. of dimethylformamide and again concentrated in a high vacuum to approx. 20 ml. 7.7 g. of BOC-Met-OCP are added thereto whilst cooling in ice, the clear solution is left to stand at 20° C. for 6 hours, and the solvent is evaporated in a high vacuum. The oily residue is dissolved in ethyl acetate and successively washed at 0° C. with 5% strength potassium carbonate solution, 0.2 N hydrochloric acid and finally with water, and the organic phase is dried over sodium sulphate and concentrated to dryness. The oily residue is crystallized from benzene-petroleum ether; melting point of 126–127° C.; on silica gel, $Rf_{43C}=0.66$; $Rf$ (toluene-acetone, 1:1)=0.58.

(8) H-Met-Leu-Gly-OMe-hydrochloride 3.24 g. of BOC-Met-Leu-Gly-OMe are dissolved in 13 ml. of 3.8 N hydrogen chloride solution in ethyl acetate, and the mixture is left to stand for 30 minutes at 20° C. The tripeptide ester hydrochloride is precipitated as a sticky mass by adding 100 ml. of petroleum ether, and the supernatant solution is decanted off. Trituration with 100 ml. of peroxide-free ether at 0° C. yields a fine powdery product, which is filtered off and dried to constant weight over potassium hydroxide in a desiccator at room temperature. The compound is chromatographically pure, but amorphous and strongly hygroscopic. It shows the following Rf values on silica gel: $Rf_{43C}=0.48$; $Rf$ (toluene-acetone, 1:1)=0.35.

(9) TRI-Cys(TRI)-Met-Leu-Gly-OMe 3.22 g. of TRI-Cys(TRI)-OH, 1.97 g. of H-Met-Leu-Gly-OMe-hydrochloride and 0.74 ml. of triethylamine are dissolved in 32 ml. of acetonitrile and 1.54 g. of dicyclohexylcarbodiimide in the solid form is added. The initially clear solution, from which dicyclohexylurea separates out, is left to stand for 16 hours at 20° C. It is then cooled to 0° C., 100 ml. of water are added, the mixture is homogenized and the white precipitate is filtered off. It is washed with water, dried and then finely triturated for 5 minutes with 50 ml. of ethyl acetate at 40° C. The insoluble dicyclohexylurea is filtered off at room temperature and washed with 20 ml. of ethyl acetate. The tetrapeptide derivative is precipitated from the filtrate as a jelly-like precipitate by adding 300 ml. of petroleum ether, and is filtered off and dried. On reprecipitating this crude product from methanol-ethyl acetate-petroleum ether, a product which is chromatographically a single substance, of melting point approx. 215° C., is obtained. On silica gel, this substance shows the following Rf values: in the system $CHCl_3$-methanol (97:3), $Rf=0.57$; in n-butyl acetate, $Rf=0.51$.

(10) H-Cys (TRI)-Met-Leu-Gly-OMe. acetate 4 ml. of water are added dropwise to a solution of 1.862 g. of TRI-Cys (TRI)-Met-Leu-Gly-OMe in 16 ml. of glacial acetic acid, in such a way that the precipitate formed always redissolves. The clear solution is stirred for one hour at room temperature and then mixed with 12 ml. of water at 0° C., the mixture is filtered, and the precipitate is washed with cold 50% strength acetic acid. The filtrate is evaporated at 30° C. in a high vacuum to give an oil, and this is triturated with water and lyophilized. The resulting white powder is dried for 15 hours over potassium hydroxide in a high vacuum. The product proves to be a single substance in a thin layer chromatogram on silica gel. In toluene-acetone (7:3), $Rf=0.28$, and in chloroform-methanol (95:5), $Rf=0.48$.

(11) H-Thr(tBu)-OMe 12.92 g. (40 mmols) of Z-Thr-(tBu)-OMe are hydrogenated in 200 ml. of glacial acetic acid, using 3 g. of palladium on charcoal (10% strength), at room temperature. The hydrogen absorption has ceased after one hour. The solution is freed of the catalyst by filtration and evaporated at 35° C. in a waterpump vacuum. After drying in a high vacuum at 35° C., 7.3 g. of an oil results; this is a single substance according to a thin layer chromatogram and is directly used further.

(12) DPC-Ser(tBu)-Thr(tBu)-OMe 19.3 g. (38.6 mmols) of DPC-Ser(tBu)-OH.cyclohexylamine salt are taken up in 500 ml. of chloroform and extracted by shaking, at 0° C., three times with 25 ml. of 1 N citric acid and five times with 40 ml. of half-saturated sodium chloride solution. The solution is dried over sodium sulphate and then evaporated, and the resulting foam is taken up in 250 ml. of ethyl acetate. 5.36 ml. (38.6 mmols) of triethylamine are added, the solution is cooled to −10° C., and 5.13 ml. (38.6 mmols) of isobutyl chlorocarbonate are added while stirring. The mixture is stirred for 10 minutes at −10° C., and a solution of 7.3 g. (38.6 mmols) of H-Thr(tBu)-OMe in 100 ml. of ethyl acetate, cooled to −12° C., is then added dropwise in such a way that the reaction temperature never exceeds −10° C. After the end of the introduction, the mixture is stirred for a further hour at −10° C. and is then left to stand overnight at room temperature. The solution is freed of the triethylamine hydrochloride which has separated out by filtration, and the filtrate is washed at 0° C., three times with 20 ml. portions of 1 N citric acid and five times with saturated sodium chloride solution, dried and evaporated. Crude product (oil): 22.07 g. For purification, 1 g. is chromatographed on a silica gel column (2.5 cm., 30 cm.). After a first run of 110 ml., 787 mg. of pure product are eluted with petroleum ether-ethyl acetate (1:1). In a thin layer chromatogram on silica gel in toluene-acetone (7:3), $Rf=0.51$.

(13) DPC-Ser(tBu)-Thr(tBu)-NH-NH$_2$ 4.253 g. (7.4 mmols) of DPC-Ser(tBu)-Thr(tBu)-OMe in 18 ml. of methanol are mixed with 5.55 ml. (approx. 110 mmols) of hydrazine hydrate and the mixture is left to stand for 10 hours at room temperature and 2 hours at 40° C. The reaction solution is taken up in 450 ml. of ethyl acetate and washed four times with half-saturated sodium chloride solution. The solution is dried over sodium sulphate, then concentrated to approx. 15 ml. and mixed with approx. 5 ml. of petroleum ether. Overnight, 3.17 g. of the hydrazide, of melting point 132–134° C., crystallize out. In a thin layer chromatogram on silica gel in toluene-acetone (7:3), $Rf=0.40$.

(14) DPC-Ser(tBu)-Thr(tBu)-Cys(TRI)-Met-Leu-Gly-OMe 2.284 g. of DPC-Ser(tBu)-Thr(tBu)-NH-NH$_2$ in 15 ml. of dimethylformamide are mixed at −20° C. with 6.5 ml. of 1.53 N hydrogen chloride solution in ethyl acetate and 0.51 ml. of t-butyl nitrite, and the mixture is stirred for 15 minutes at −10° C. After adding 1.4 ml. of triethylamine, a solution of 1.406 g. of H-Cys(TRI)-Met-Leu-Gly-OMe-acetate in 10 ml. of dimethylformamide, cooled to −10° C., is added dropwise. The pH of the reaction solution is then ∼5. The pH is adjusted to 7–8 by adding 2 drops of triethylamine in dimethylformamide [2.8 ml. of triethylamine, made up to 10 ml. with dimethylformamide]. The pH is again raised to 7–8 by means of 2 drops of triethylamine solution added after 5, 10 and 20 minutes. Thereafter, this pH value remains constant. The reaction solution is kept for one hour at −10° C. and 15 hours at 0° C. The triethylamine hydrochloride which has separated out is then filtered off and the filtrate is evaporated at 30° C. in a high vacuum to give an oil. Trituration with water yields a powder, which is washed with water and then triturated with water and lyophilized. The hexapeptide derivative is obtained pure by twice triturating with 10 ml. of benzene-petroleum ether (1:2). In a thin layer chromatogram on silica gel in toluene-acetone (7:3), R$f$=0.42.

(15) H-Ser(tBu)-Thr(tBu)-Cys(TRI)-Met-Leu-Gly-OMe 2 g. of DPC-Ser(tBu)-Thr(tBu)-Cys(TRI)-Met-Leu-Gly-OMe are dissolved in 40 ml. of 80% strength glacial acetic acid at 45° C. and the mixture is subsequently left to stand for 1 hour at 45° C. It is then concentrated in vacuo to a volume of approx. 10 ml. and lyophilized. In order to remove acetic acid completely, the residue is dissolved in 15 ml. of tert.butanol and 1.5 ml. of water and again lyophilized. A powdery residue is obtained, which is dissolved in 5 ml. of methanol and 20 ml. of ethyl acetate and reprecipitated by adding 150 ml. of petroleum ether. After brief standing at 0° C., the product is filtered off, washed with petroleum ether and dried. An amorphous powder of melting point 180° C. is obtained, which only retains traces of 2-(p-biphenylyl)-propanol(-2) as the sole impurity. The hexapeptide is used in this form for further processing. It shows the following R$f$ values in a thin layer chromatogram on silica gel: in chloroform-acetone (1:1), R$f$=0.48; in chloroform-methanol (9:1), R$f$=0.54; in toluene-acetone (1:1), R$f$=0.49.

(16) H-Ser(tBu)-Thr(tBu)-Cys(TRI)-Met-Leu-Gly-OH 1.4 g. of hexapeptide methyl ester are dissolved in 16 ml. of 90% strength methanol at 45° C., and the solution is cooled to 20° C. (whereupon the peptide partially reprecipitates) and mixed with 4.32 ml. of 1 N sodium hydroxide solution. The suspension is stirred for 25 minutes at 22° C. (after approx. 15 minutes, all the material has dissolved to give a clear solution), and the hexapeptide is then precipitated in a fine flocculent form by adding 4.32 ml. of 1 N hydrochloric acid and 30 ml. of water. The mixture is left to stand for a further 15 minutes at 0° C., and the product is filtered off and washed with water until the filtrate is free of chloride ions. After drying over potassium hydroxide and phosphorus pentoxide 1.3 g. of crude product are obtained, and this is purified by homogenizing it for 5 minutes at 80° C. with a mixture of 25 ml. of dimethylformamide and 60 ml. of benzene and precipitating it by adding 120 ml. of petroleum ether. After allowing the mixture to stand for 10 minutes at 0° C., the product is filtered off, washed with benzene and petroleum ether and dried. The chromatographically pure hexapeptide derivative thus obtained shows a decomposition point of approx. 210° C. and is very sparingly soluble in many solvents. On thin layer chromatography on silica gel, R$f_{45}$=0.39, R$f_{52}$=0.77, and R$f_{100}$=0.47.

(17) BOC-Cys(TRI)-Gly-Asn-Leu-Ser(tBu)-Thr(tBu)-Cys(TRI)-Met-Leu-Gly-OH 1.04 g. of BOC-Cys(TRI)-Gly-Asn-Leu-NH-NH$_2$ are dissolved in 8 ml. of absolute dimethylfomamide, the solution is cooled to −25° C., and 0.92 ml. of 3.6 N hydrochloric acid in dioxane are slowly added dropwise, followed by 0.179 ml. of tert. butyl nitrite. This mixture is stirred for 15 minutes at −10° C., cooled to −15° C., and pipetted into a solution, cooled to −15° C., of 878 mg. of H-Ser(tBu)-Thr(tBu)-Cys(TRI)-Met-Leu-Gly-OH and 0.588 ml. of triethylamine in 12 ml. of absolute dimethylformamide. The mixture is stirred for approx. 10 minutes at −10° C. for 3 hours at 0° C. In order to maintain a weakly basic reaction (pH approx. 8), 2 portions of 0.065 ml. of triethylamine are additionally added initially. The mixture is left to stand for 15 hours at 0° C. and is then concentrated in a high vacuum to a pasty consistency. The decapeptide derivative is precipitated by adding 50 ml. of methanol. The suspension is warmed to 40° C. for 5 minutes and left to stand for 10 minutes at 0° C., and the precipitate is filtered off and washed with 20 ml. of methanol. On drying in a high vacuum over potassium hydroxide and phosphorus pentoxide, pure decapeptide derivative, having an ill-defined decomposition point at approx. 220–230° C., is obtained. It shows the following R$f$ values in a thin layer chromatogram on silica gel: in the system chloroform-methanol (8:2), R$f$=0.28; in the system 70, R$f$=0.55; in the system 104, R$f$=0.75; in the system 121A, R$f$=0.59.

(18) BOC-Cys-Gly-Asn-Leu-Ser(tBu)-Thr(tBu)-Cys-Met-Leu-Gly-OH 1.7 g. of BOC-Cys(TRI)-Gly-Asn-Leu-Ser(tBu)-Thr(tBu)-Cys(TRI)-Met-Leu-Gly-OH are dissolved in 170 ml. of hot dimethylformamide and after cooling to room temperature the solution is added, over the course of 1 hour, to an intensively stirred solution of 2.5 g. of iodine in 500 ml. of methanol. Thereafter the solution is stirred for a further hour, then cooled to 0° C. and almost completely decolorized with 1 N sodium thiosulphate. After concentrating the solution in vacuo, finally in a high vacuum at 40° C., to approx. 100 ml., the product is completely precipitated with ether, whereupon the oil which separates out rapidly solidifies. After decanting the ether solution, the residue is briefly dried in vacuo and then triturated with water. The decapeptide derivative which has precipitated is filtered off, washed with water and dried. It is purified by dissolving in 25 ml. of chloroform, filtering off a small amount of insoluble material, concentrating the filtrate to about half, and precipitating with hexane. The pure decapeptide derivative, which in a thin layer chromatogram on silica gel shows R$f_{100}$=0.48 and R$f_{45}$=0.30, is obtained.

EXAMPLE 2

H-Cys-Gly-Asn-Leu-Ser-Thr-Cys-Met-Leu-Gly-Thr-Leu-Thr-Gln-Asp-Leu-Asn-Lys-Leu-His-Thr-Phe-Pro-Gln-Thr-Ala-Ile-Gly-Val-Gly-Ala-Pro-NH$_2$-Leu$^{12,16,19}$-calcitonin M 50 mg. of BOC-Cys-Gly-Asn-Leu-Ser(tBu)-Thr(tBu)-Cys-Met-Ley-Glu-Thr-(tBu)-Leu-The(tBu)-Gln-Asp(OtBu)-Leu-Asn-Lys(BOC)-Leu-His-Thr(tBu)-Phe-Pro-Gln-Thr(tBu)-Ala-Ile-Gly-Val-Gly-Ala-Pro-NH$_2$ are dissolved in 1.2 ml. of concentrated hydrochloric acid at 0° C., and the solution is flushed with nitrogen and left to stand for 10 minutes at 0° C. The solution is worked up in the same manner as described in Example 1. The product thus obtained (acetate of Leu$^{12,16,19}$-calcitonin M) is equilibrated with atmospheric moisture by allowing it to stand in an open vessel, and is an amorphous, white powder. In thin layer chromatography on "Alox" D-0 aluminum oxide, it shows the following R$f$ values: R$f_{52}$=0.39, R$f_{79}$=0.48. In electrophoresis on cellulose thin layer plates ("Avicel" ready-to-use plates 1440) it migrates 3.7 cm. towards the cathode in 1½ hours at pH 1.9 and 16 volts/cm.

The protected dotriacontapeptide is for example manufactured as follows:

(a) Starting from H-Leu-OMe, the hexapeptide derivative Z-Thr(tBu)-Leu-Thr(tBu)-Gln-Asp(OtBu)-Leu-OMe is synthesized stepwise using the following sequence of activated esters: Z-Asp(OtBu)-ONP, Z-Gln-ONP, Z-Thr(tBu)-OSU, Z-Leu-ONP and Z-Thr(tBu)-OSU. The condensations are carried out in dimethylformamide solution and the catalytic hydrogenations—with the exception of Z-Asp(OtBu)-Leu-OMe, where 1 equivalent of HCl is added—are carried out in neutral, methanolic solution. Finally, the C-terminal methyl ester group is converted into the hydrazide by means of hydrazine hydrate in methanolic solution.

(b) Condensation of Z-Lys(BOC)-Leu-N$_3$ with H-His-OMe in tetrahydrofuran yields Z-Lys(BOC)-Leu-His-OMe, which is hydrogenated in methanolic solution and subsequently reacted with Z-Asn-ONP in dimethylformamide to give the tetrapeptide Z-Asn-Lys-(BOC)-Leu-His-OMe. This is converted into the hydrazide in the usual manner, and the latter is in turn condensed, according to the azide method, with H-Thr(tBu)-Phe-Pro-Gln-Thr (tBu)-Ala-Ile-Gly-OH·CH₃COOH (manufactured by condensation of Z-Thr(tBu)-Phe-Pro-OH, which is obtained from Z-Thr(tBu) OSU and H-Phe-Pro-OH in dimethylformamide, with H-Gln-Thr(tBu)-Ala-Ile-Gly-OMe. HCl in dimethylformamide in the presence of dicyclohexylcarbodiimide and N-hydroxysuccinimide, saponification of the ester, in 90% strength methanol, with 1 N sodium hydroxide solution and hydrogenation of the Z-Thr(tBu)-Phe-Pro-Gln-Thr(tBu)-Ala-Ile-Gly-OH in 80% strength acetic acid in the presence of palladium on charcoal) in 90% strength dimethylformamide, to give the dodecapeptide. The Z-Asn-Lys(BOC)-Leu-His-Thr(tBu)-Phe-Pro-Gln-Thr(tBu)-Ala-Ile-Gly-OH thus obtained is hydrogenated in 80% strength acetic acid and is then condensed with a freshly prepared solution of Z-Thr(tBu)-Leu-Thr(tBu)-Gln-Asp(OtBu)-Leu-N₃ in dimethylformamide. The resulting octadecapeptide is condensed with H-Val-Gly-Ala-Pro-NH₂ by means of dicyclohexylcarbodiimide and N-hydroxysuccinimide in dimethylformamide, and the crude docosapeptide-amide is purified in a Craig distribution in the solvent system methanol-buffer-chloroform-carbon tetrachloride (10:4:5:6) and subsequently hydrogenated in 80% strength acetic acid. Solution in methanol and dropwise addition to an 0.1 N aqueous sodium carbonate solution yield the acetate-free form, which is condensed with BOC-Cys-Gly-Asn-Leu-Ser-(tBu)-Thr(tBu)-Cys-Met-Leu-Gly-OH by means of dicyclohexylcarbodiimide and N-hydroxysuccinimide to give the completely protected dotriacontapeptide-amide. This is in turn purified in a Craig distribution in the system methanol-buffer-chloroform-carbon tetrachloride (11:4:6:7).

In detail, the synthesis of the starting material takes place via the following stages:

(1) Z-Asp(OtBu)-Leu-OMe 4.97 g. of Z-Asp(OtBu)-ONP together with 2.54 g. of leucine methyl ester hydrochloride are dissolved in 20 ml. of absolute dimethylformamide and 1.60 ml. of N-methylmorpholine are added dropwise with stirring, at room temperature, over the course of 1 hour. The lemon-yellow suspension is left to stand for 16 hours at room temperature, the N-methylmorpholine hydrochloride which has precipitated is filtered off, and the filtrate is evaporated. The resulting oil is dissolved in ethyl acetate and then washed at 0° C., twice with dilute, aqueous aqueous citric acid solution, once with dilute aqueous sodium hydroxide solution, six times with dilute aqueous sodium carbonate solution and finally with water until the wash liquid remains neutral. After drying over sodium sulphate, the product is evaporated and the resulting oil is recrystallized from ether-petroleum ether; melting point: 72–74° C., $[d]_D^{20} = -27°$ (c.=1.9 in methanol). On silica gel, the $Rf$ values in the thin layer chromatogram in the system 43 A=0.68, and in the system 89=0.75.

(2) H-Asp(OtBu)-Leu-OMe. HCl 4.23 g. of Z-Asp(OtBu)-Leu-OMe are dissolved in 30 ml. of methanol and decarbobenzoxylated with hydrogen at room temperature, with the addition of 4.64 ml. of hydrogen chloride in methanol (2.03 N, 9.4 mmols) and 420 mg. of palladium on charcoal catalyst (10% strength). When the hydrogen absorption has ceased, the mixture is filtered, the filtrate is evaporated, the resulting yellow oil is dissolved in 18 ml. of N,N-dimethylformamide, the solution is again evaporated and the residue is dissolved in 19 ml. of dimethylformamide. This solution is used without further purification for the next stage.

(3) Z-Gln-Asp(OtBu)-Leu-OMe 4.90 g. of solid Z-Gln-ONP and 1.07 ml. of N-methylmorpholine are added at room temperature to a solution of 3.31 g. of H-Asp(OtBu)-Leu-OMe·HCl in 19 ml. of dimethylformamide, and the solution is left to stand for 15 hours at room temperature. It is then evaporated, the resulting, crystalline product is dissolved in a mixture of n-butanol and ethyl acetate (1:5), and the solution is extracted by shaking as described under (1) dried and evaporated.

The resulting, solid product is recrystallized from methanol-ethyl acetate-petroleum ether, melting point: 186–187° C., $[\alpha]_D^{20} = -43°$ (c.=1.9 in methanol). On silica gel, the $Rf$ values in a thin layer chromatogram in the system 89=0.46, and in the system 43 A=0.61.

(4) H-Gln-Asp(OtBu)-Leu-OMe 4.12 g. of Z-Gln-Asp(OtBu)-Leu-OMe are suspended in 30 ml. of methanol and decarbobenzoxylated with hydrogen at room temperature with the addition of 410 mg. of palladium on charcoal catalyst (10% strength). When the hydrogen absorption has ceased, the mixture is filtered, the filtrate is evaporated, and the resulting, almost colorless oil is dissolved in 13 ml. of dimethyl formamide, the solution is agin evaporated and the residue is dissolved in 13 ml. of dimethylformamide. The solution is used without further purification for the next stage.

(5) Z-Thr(tBu)-Gln-Asp(OtBu)-Leu-OMe 3.47 g. of solid Z-Thr(tBu)OSU are added to a solution of 3.16 g. of H-Gln-Asp(OtBu)-Leu-OMe in 13 ml. of dimethylformamide and the resulting clear solution is left to stand for 18 hours at room temperature. Thereafter the solution is evaporated almost to dryness and treated with ether, and the white precipitate formed is filtered off. The powder, which is a single substance in a thin layer chromatogram, melts at 180–182° C. In a thin layer chromatogram on silica gel, $Rf_{89}=0.53$. $Rf_{121'}=0.77$.

(6) H-Thr(tBu)-Gln-Asp(OtBu)-Leu-OMe 4.28 g. of Z-Thr(tBu)-Gln-Asp(OtBu)-Leu-OMe are dissolved in 40 ml. of methanol and decarbobenzoxylated with hydrogen at room temperature, with the addition of 420 mg. of palladium on charcoal (10% strength). When the absorbtion of hydrogen has ceased, the mixture is filtered and the filtrate evaporated, whereby the product is produced as a sticky foam which is a single substance in a thin layer chromatogram. In a thin layer chromatogram on silica gel, $Rf_{121'}=0.84$; $Rf$ in the system chloroform-methanol (9:1)=0.16.

(7) Z-Leu-Thr(tBu)-Gln-Asp(OtBu)-Leu-OMe 3.52 g. of H-Thr(tBu)Gln-Asp(OtBu)-Leu-OMe are dissolved in 15 ml. of dimethylformamide, the solution is evaporated, the residue is again dissolved in 20 ml. of dimethylformamide and 2.86 g. of solid Z-Leu-ONP are added. The clear, intensely yellow solution is left to stand for 15 hours at room temperature, whereupon the above pentapeptide derivative precipitates as crystals. 20 ml. of water and 50 ml. of a mixture of dimethylformamide-water (1:3) are added to this suspension, and the product which has precipitated is filtered off and recrystallized from chloroform-methanol-petroleum ether. Melting point 222–223° C., $[\alpha]_D^{20} = -19°$ (c.=0.9 in chloroform). In a thin layer chromatogram on silica gel, $Rf_{89}=0.57$.

(8) Z-Thr(tBu)-Leu-Thr(tBu)-Gln-Asp(OtBu)-Leu-NHNH₂

1.5 g. of Z-Leu-Thr(tBu)-Gln-Asp(OtBu)-Leu-OMe are dissolved in 75 ml. of methanol and 7.5 ml. of hydrazine hydrate are added with ice cooling. The clear solution is left to stand for 15 hours at room temperature and is then treated with an ice-cold mixture of 250 ml. of water and 8.8 ml. of glacial acetic acid, whereupon the product precipitates in a finely flocculent form. It is purified by a Craig counter-current distribution. 1.06 g. of the hexapeptide derivative are distributed over the first five tubes of a distribution apparatus (phase volumes 3 ml. each). The solvent system methanol-buffer-chloroform-carbon tetrachloride (10:3:5:4) is used (buffer: 28.6 g. of glacial acetic acid and 19.3 g. of ammonium acetate, dissolved in 960 ml. of water). A multiplicative distribution over 240 stages ($r_{max.}$=52, K=0.28) is carried out. The ammonium acetate is sublimed off the resulting pure fractions (distribution elements No. 47–66) in a high vacuum at 40° C., and the hexapeptide-hydrazide is recrystallized from methanol-water. In a thin layer chromatogram on silica gel, $Rf_{89}$=0.47; in the system chloroform-methanol (85:15), $Rf$=0.44.

(9) Z-Lys(BOC)-Leu-His-OMe 3.02 g. of Z-Lys(BOC)-Leu-NH-NH$_2$ in 30 ml. of dimethylformamide are mixed at −20° C. with 5.25 ml. of 3.0 N HCl in dioxane and with 0.9 ml. of t-butyl nitrite. After 10 minutes at −13° C. to −10° C., the mixture is cooled to −30° C. and 2.38 ml. of N-ethyldiisopropylamine are added. A solution of 1.83 g. of histidine methyl ester dihydrochloride in 30 ml. of dimethylformamide, precooled to 0° C., is then added at −30° C. The suspension thereby obtained is left to stand for one hour at −10° C. and 18 hours at 0° C. After evaporation, the resulting oil is taken up in ethyl acetate and washed three times with dilute, aqueous sodium hydrogen carbonate solution and then with water until the wash liquid remains neutral. After evaporating off the ethyl acetate, the resulting solid product is reprecipitated from methanol-chloroform-ether, whereby a slightly yellow-colored powder is obtained, which is a single substance in a thin layer chromatogram. Melting point: 144–145° C., $[\alpha]_D^{20}$=+15° (c.=2.0 in chloroform).

The $Rf$ values in a thin layer chromatogram on silica gel are: in the system 52=0.60; in the system 89=0.35.

(10) H-Lys(BOC)-Leu-His-OMe 2.65 g. of Z-Lys(BOC)-Leu-His-OMe are dissolved in 30 ml. of methanol and hydrogenated with hydrogen at room temperature, with the addition of 270 mg. of palladium on charcoal (10% strength). After hydrogen absorption has ceased, the mixture is filtered and the filtrate is evaporated, whereby a yellow oil is obtained, which is immediately used further.

(11) Z-Asn-Lys(BOC)-Leu-His-OMe 2.10 g. of the tripeptide methyl ester obtained under (10) are dissolved in 15 ml. of dimethylformamide and mixed at room temperature with 2.07 g. of solid Z-Asn-ONP. After 15 hours, the clear, yellow solution is evaporated and the residue is reprecipitated from methanol-chloroform-ether, then from methanol-acetone-ether, and then from methanol-ethyl acetate-petroleum ether. The white powder melts at 178–180° C.

In a thin layer chromatogram on silica gel, $Rf_{52}$=0.40; $Rf_{89}$=0.16.

(12) Z-Asn-Lys(BOC)-Leu-His-NH-NH$_2$ 2.57 g. of Z-Asn-Lys(BOC)-Leu-His-OMe are dissolved in a mixture of 20 ml. of methanol and 3.5 ml. of dimethylformamide and mixed with 1.65 ml. of hydrazine hydrate at room temperature. The solution is left to stand for 18 hours at room temperature, whereupon the above tetrapeptide-hydrazide precipitates. 100 ml. of water are then added, and the precipitate is filtered off and washed with water, until the wash water reacts neutral. The resulting white, amorphous powder is reprecipitated from chloroform-methanol-ether. Melting point: 209–210° C.

In a thin layer chromatogram on silica gel, $Rf_{100}$=0.36; $Rf$ in the system isopropanol-concentrated ammonia (90:10)=0.54.

(13) Z-Asn-Lys(BOC)-Leu-His-Thr(tBu)-Phe-Pro-Gln-Thr(tBu)-Ala-Ile-Gly-OH 1.03 g. of Z-Asn-Lys(BOC)-Leu-His-NH-NH$_2$ are dissolved in 11 ml. of dimethylformamide, the solution is cooled to −20° C., and 1.13 ml. of 3.0 N HCl in dioxane as well as 0.202 ml. of t-butyl nitrite are then added. The solution is left to stand for 15 minutes at −15° C. and then cooled to −20° C., and a solution of 856 mg. of H-Thr(tBu)-Phe-Pro-Gln-Thr(tBu)-Ala-Ile-Gly-OH in 20 ml. of dimethylformamide as well as 0.584 ml. of N-ethyldiisopropylamine are added dropwise. The solution is left to stand for 16 hours at +5° C., 85 ml. of 1% strength acetic acid are then added, and the precipitate formed is filtered off and washed with water until free of chloride. For purification, the product is recprecipitated from methanol-chloroform-petroleum ether, then from dimethylformamide-water, and from methanol-water. Melting point: 209–211° C.

In a thin layer chromatogram on silica gel, $Rf_{100}$=0.35; $Rf_{70}$=0.44; $Rf$ in the system isopropanol-concentrated ammonia (90:10)=0.32.

(14) H-Asn-Lys(BOC)-Leu-His-Thr(tBu)-Phe-Pro-Gln-Thr(tBu)-Ala-Ile-Gly-OH 678 mg. of the product described under (13) are dissolved in 80 ml. of 80% strength acetic acid and hydrogenated with hydrogen at room temperature, with the addition of 75 mg. of palladium on charcoal (10% Pd). After hydrogen absorption has ceased, the mixture is filtered, the filtrate is evaporated almost to dryness, and the residue is taken up in glacial acetic acid and lyophilized. The lyophilized product is dissolved in 70% strength t-butanol and again lyophilized.

In a thin layer chromatogram on silica gel, $Rf_{52}$=0.17; $Rf_{70}$=0.36.

(15) Z-Thr(tBu) - Leu - Thr(tBu)-Gln-Asp(OtBu)-Leu-Asn-Lys(BOC)-Leu - His - Thr(tBu)-Phe-Pro-Gln-Thr(tBu)-Ala-Ile-Gly-OH 368 mg. of Z-Thr(tBu)-Leu-Thr(tBu)-Gln-Asp(OtBu)-Leu-NH-NH$_2$ are dissolved in 3.1 ml. of dimethylformamide, the solution is cooled to −20° C., and 325 μl. of 3.0 N HCl in dioxane as well as 55 μl. of t-butyl nitrite are added. The solution is left to stand for 15 minutes at −15° C. to −10° C.; a solution of H-Asn-Lys(BOC)-Leu - His - Thr(tBu)-Phe-Pro-Gln-Thr(tBu)-Ala-Ile-Gly-OH in 7.5 ml. of dimethylformamide as well as 169 μl. of N-ethyldiisopropylamine is then added at −15° C. The solution is stirred for 2 hours in an ice bath, and during this time a further 42 μl. of N-ethyldiisopropylamine are added in 4 portions. The solution is now left to stand for 15 hours at +5° C. and is then added dropwise to ether. The resulting white precipitate is dissolved in dimethylformamide and again added dropwise to ether, and the resulting precipitate is again dissolved in dimethylformamide and the solution added dropwise to 0.02 N HCl cooled to 0° C. (to which 10 ml. of saturated sodium chloride solution are added per 100 ml. volume). The amorphous product thereby obtained is dissolved in 80% strength acetonitrile and precipitated with water at 50° C.

In a thin layer chromatogram on silica gel, $Rf_{52}$=0.36; $Rf_{70}$=0.50; $Rf_{100}$=0.37.

(16) H-Val-Gly-Ala-Pro-NH$_2$ 194 mg. of Z-Val-Gly-Ala-Pro-NH$_2$ are suspended in 17 ml. of 80% strength methanol and hydrogenated with hydrogen at room temperature, with the addition of 60 mg. of palladium on charcoal (10% strength). When hydrogen absorption has ceased, the mixture is filtered, the filtrate is evaporated, and the resulting oil is dissolved in t-butanol and lyophilized. The $Rf$ values of the white powder thereby obtained, in a thin layer chromatogram on silica gel, are: in the system 96=0.22; in the system chloroform-methanol (1:1)=0.17.

(17) Z-Thr(tBu) - Leu - Thr(tBu)-Gln-Asp(OtBu)-Leu-Asn-Lys(BOC)-Leu - His - Thr(tBu)-Phe-Pro-Gln-Thr(tBu)-Ala-Ile-Gly-Val-Gly-Ala-Pro-NH$_2$ 375 mg. of the compound described under (15), are dissolved in 4.41 ml. of dimethylformamide, 77 mg. of H-Val-Gly-Ala-Pro-NH$_2$, 26 mg. of N-hydroxysuccinimide and 46 mg. of dicyclohexylcarbodiimide are added at room temperature, and the solution is stirred for 18 hours at 45° C. This solution is subsequently added dropwise to ether, and the resulting white powder is subjected to a Craig counter-current distribution: 435 mg. of the docosapeptide-amide are distributed over the first four tubes of a distribution apparatus (phase volumes 3 ml. each), the solvent system methanol-buffer-chloroform-carbon tetrachloride, 10:4:5:6 (buffer as below) being used. A multiplicative distribution over a total of 550 stages ($r_{max}=70$, K=0.15) is carried out. The ammonium acetate is sublimed off the pure fractions in a high vacuum at 40° C. The pure, protected docosapeptide-amide shows the following Rf values in a thin layer chromatogram on silica gel: R$f_{70}$=0.68; R$f_{52}$=0.31; R$f_{100}$=0.40; R$f_{43E}$=0.62.

(18) H-Thr(tBu)-Leu-Thr(tBu) - Gln - Asp(OtBu)-Leu-Asn - Lys(BOC)-Leu-His-Thr(tBu)-Phe-Pro-Gln-Thr(tBu)-Ala-Ile-Gly-Val-Gly-Ala-Pro-NH$_2$ 138 mg. of the product described under (17) are dissolved in 13.8 ml. of 80% strength acetic acid and hydrogenated for 18 hours with hydrogen at room temperature, with the addition of 25 mg. of palladium on charcoal catalyst (10% Pd). The mixture is then filtered, the filtrate evaporated, and the residue dissolved in glacial acetic acid and lyophilized. The resulting lyophilized product is dissolved in a little methanol, and the solution is adjusted to a pH value of between 7 and 8 with saturated sodium hydrogen carbonate solution and then added dropwise to a 0.1 N sodium carbonate solution. A white powder is obtained; in a thin layer chromatogram on silica gel, R$f_{100}$=0.24; R$f_{70}$=0.64; R$f_{43E}$=0.57.

(19) BOC-Cys-Gly-Asn-Leu-Ser(tBu)-Thr(tBu)-Cys-Met-Leu-Gly-Thr(tBu)-Leu-Thr(tBu)-Gln-Asp(OtBu)-Leu-Asn-Lys-(BOC)-Leu-His-Thr(tBu)-Phe-Pro-Gln-Thr(tBu)-Ala-Ile-Gly-Val-Gly-Ala-Pro-NH$_2$ 93 mg. of the docosapeptide-amide described under (18), and 50 mg. of the protected decapeptide BOC-Cys-Gly-Asn-Leu-Ser(tBu)-Thr(tBu)-Cys-Met-Leu-Gly-OH are dissolved in 0.7 ml. of dimethylformamide with warming, and the solution is then mixed, at room temperature, with 9.5 mg. of solid N-hydroxy-succinimide and 12.8 mg. of solid dicyclohexylcarbodiimide and stirred for 3½ hours at 45° C. Thereafter the solution is added dropwise to 14 ml. of initially introduced, peroxide-free ether, and the resulting white powder is purified by subjecting it to a Craig counter-current distribution: 126 mg. of the crude dotriacontapeptide-amide are distributed over the first two tubes of a distribution apparatus (phase volumes 3 ml. each), with the solvent system methanol-buffer-chloroform-carbon tetrachloride, 11:4:6:7 (buffer as below) being used. A multiplicative distribution of a total of 210 stages ($r_{max}=87$, K=0.7) is carried out. The ammonium acetate is sublimed off the pure fractions in a high vacuum at 40° C.; the protected dotriacontapeptideamide shows R$f_{100}$=0.40 and R$f_{70}$=0.58 in a thin layer chromatogram on silica gel.

EXAMPLE 3

H-Cys-Gly-Asn-Leu-Ser-Thr-Cys-Met-Leu-Gly-Lys-Tyr-Thr-Gln-Asp-Phe-Asn-Lys-Phe-His-Thr-Phe-Pro-Arg-Thr-Ala-Ile-Gly-Val-Gly-Ala-Pro-NH$_2$ (Lys$^{11}$-Arg$^{24}$-calcitonin M)

81 mg. of

BOC-Cys-Gly-Asn-Leu-Ser(tBu)-Thr(tBu)-Cys-Met-Leu-Gly-Lys(BOC)-Tyr(tBu)-Thr(tBu)-Gln-Asp(OtBu)-Phe-Asn-Lys(BOC)-Phe-His-Thr(tBu)-Phe-Pro-Arg-Thr(tBu)-Ala-Ile-Gly-Val-Gly-Ala-Pro-NH$_2$ are covered, at 0° C., with 2 ml. of ice-cold, concentrated hydrochloric acid, and the mixture is flushed with nitrogen and stirred for 10 minutes in a closed vessel at 0° C. After cooling to approx. −60° C., the mixture is subjected to a high vacuum, and the solution is concentrated whilst the temperature slowly rises to 0° C. Thereafter 2 ml. of water are added and the product is lyophilized. In order to replace the chloride ions by acetate ions, the lyophilized product, dissolved in 2 ml. of 0.1 N acetic acid, is then allowed to run through a column (diameter 6 mm., l=12 cm.) of Amberlite CG-45 (weakly basic ion exchanger, in acetate form). The eluate, which is checked by means of ultraviolet, is lyophilized, further dried in a high vacuum over phosphorus pentoxide, and equilibrated with atmospheric moisture by allowing it to stand in an open vessel. The acetate of Lys$^{11}$. Arg$^{24}$-calcitonin M is thus obtained.

In thin layer chromatography, the dotriacontapeptide-amide shows a trace of the corresponding Met$^8$-sulphoxide derivative as the sole impurity. In a thin layer chromatogram on "Alox"-D-O, R$f_{52}$=0.51; R$f_{45}$=0.43; on "Selecta" cellulose (ready-to-use plates of Messrs. Schleicher and Schuell), R$f_{45}$=0.49; R$f_{101A}$=0.55.

In electrophoresis on "Selecta" 1440 cellulose, the substance migrates 5.6 cm. towards the cathode in 1.5 hours at pH 1.9 and at 280 volts.

The starting material can for example be manufactured as follows:

Z-Arg-OH is reacted with H-Thr(tBu)-Ala-Ile-Gly-OH in dimethylformamide in the presence of dicyclohexylcarbodiimide to give Z-Arg-Thr(tBu)-Ala-Ile-Gly-OH, and the carbobenzoxy group is removed in 80% strength aqueous methanol, containing hydrochloric acid, in the presence of palladium on charcoal. Z-Thr(tBu)-Phe-Pro-OH, in the form of the mixed anhydride (with carbonic acid isobutyl ester) is condensed with the resulting H-Arg-Thr(tBu)-Ala-Ile-Gly-OH to give Z-Thr(tBu)-Phe-Pro-Arg-Thr(tBu)-Ala-Ile-Gly-OH. After catalytic hydrogenation in 80% strength acetic acid in the presence of palladium on charcoal, this compound is reacted with a solution of Z-Asn-Lys(BOC)-Phe-His-azide in dimethylformamide to give Z-Asn-Lys(BOC)-Phe-His-Thr(tBu)-Phe - Pro - Arg - Thr(tBu) - Ala-Ile-Gly-OH. The dodecapeptide derivative is decarbobenzoxylated in 80% strength acetic acid in the presence of palladium on charcoal and condensed with Z - Lys(BOC) - Tyr(tBu)-Thr(tBu)-Gln-Asp(OtBu)-Phe-azide, which is obtained by condensation of the mixed anhydride of Z-Lys(BOC)-OH (with carbonic acid isobutyl ester) with H-Tyr(tBu)-Thr(tBu)-Gln-Asp(OtBu)-Phe-OMe to give Z-Lys (BOC)-Tyr(tBu)-Thr(tBu)-Gln-Asp(OtBu)-Phe-OMe, is conversion into the hydrazide by means of hydrazine hydrate in methanol, and reaction of the hydrazide to give the azide by means of tert.-butyl nitrite in dimethylformamide, with the addition of hydrogen chloride in dioxane. The Z-Lys(BOC)-Tyr(tBu)-Thr(tBu) - Gln-Asp(OtBu) - Phe-Asn-Lys(BOC)-Phe-His-Thr(tBu) - Phe - Pro-Arg-Thr(tBu)-Ala-Ile-Gly-OH thus obtained is reacted with H-Val-Gly-Ala-Pro-NH$_2$ by means of dicyclohexylcarbodiimide and N-hydroxysuccinimide in dimethylformamide, to give the protected docosapeptide-amide. This is purified by Craig distribution and is then hydrogenated in 80% strength acetic acid in the presence of palladium on charcoal. Repricipitation from methanol into 0.1 N sodium carbonate yields the free base, which is condensed with BOC-Cys-Gly-Asn-Leu-Ser(tBu)-Thr(tBu)-Cys-Met-Leu-Gly-OH in dimethylformamide by means of dicyclohexylcarbodiimide and hydroxysuccinimide to give the protected dotriacontapeptide-amide. The product is again purified by Craig distribution.

EXAMPLE 4

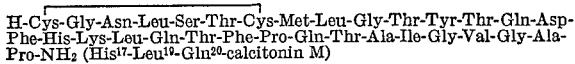
(His$^{17}$-Leu$^{19}$-Gln$^{20}$-calcitonin M)

470 mg. of

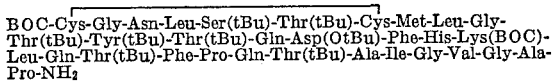

are covered, at 0° C., with 10 ml. of ice-cold, concentrated hydrochloric acid. The mixture is flushed with nitrogen and then stirred for 10 minutes at 0° C. in a closed vessel. After cooling to approx. —60° C., the mixture is subjected to a high vacuum and the solution is concentrated whilst slowly raising the temperature to 0° C. Thereafter 15 ml. of water are added and the product is lyophilized. The lyophilized product is dissolved in 6 ml. of 0.1 N acetic acid, and in order to replace the chloride ions by acetate ions the solution is allowed to flow through a column (diameter=10 mm., 1=16 cm.) of Amberlite CG-45 (weakly basic anion exchanger in acetate form). The eluate, which is checked on an ultraviolet continuous flow analyzer is lyophilized, and the product is further dried in a high vacuum over phosphorus pentoxide and equilibrated with atmospheric moisture by allowing it to stand in an open vessel. The acetate of His$^{17}$-Leu$^{19}$-Gln$^{20}$-calcitonin M is thus obtaned. The product s electrophoretically a single substance.

In thin layer electrophoresis on "Selecta" 1440 cellulose (ready-to-use plates from Schleicher and Schull), it migrates 3.5 cm. towards the cathode in 1.5 hours at pH 1.9 (buffer as in Example 1) and at 280 volts. The dotriacontapeptide-amide shows the following figures in thin layer chromatography: on "Selecta" 1440 cellulose, $Rf_{45}=0.52$; $Rf_{101A}=0.60$; on "Alox" D-O: $Rf_{45}=0.46$, $Rf_{52}=0.57$; $Rf_{79}=0.68$.

The protected dotriacontapeptide-amide is for example manufactured as follows:

Z-Lys(BOC)-OH is reacted with isobutyl chlorocarbonate to give the mixed anhydride, and this is condensed with H-Leu-OMe to give the protected dipeptide ester Z-Lys-(BOC)-Leu-OMe of melting point 113–114° C. This is converted into the hydrazide (melting point 154°–155° C.) by means of hydrazine hydrate in methanol. The azide is manufactured from the hydrazide according to Rudinger, by means of tert.butyl nitrite in dioxane with the addition of hydrogen chloride, and is coupled with H-Gln-OMe, with the addition of diisopropylethylamine, to give Z-Lys(BOC)-Leu-Gln-OMe. Neutral hydrogenation in methanol with palladium on charcoal yields Lys(BOC)-Leu-Gln-OMe. This is coupled with Z-His-N$_3$ according to the Rudinger azide method, as above, so that Z-His-Lys(BOC)-Leu-Gln-OMe is obtained. This ester is again converted into the azide via the hydrazide, according to Rudinger, and coupled, according to Rudinger, with H-Thr(tBu)-Phe-Pro-Gln-Thr(tBu)-Ala-Ile-Gly-OH (compare Example 2), using diisopropylethylamine as the base. Catalytic hydrogenation with palladium on charcoal, in 80% strength acetic acid, yields H-His-Lys(BOC)-Leu-Gln-Thr(tBu)-Phe-
Pro-Gln-Thr(tBu)-Ala-Ile-Gly-OH, which is condensed according to the azide method, as before, with Z-Thr(tBu)-Tyr(tBu)-Thr(tBu)-Gln-Asp-(OtBu)-Phe-N$_3$ (compare Example 1) to give Z-Thr(tBu)-Tyr(tBu)-Thr(tBu)-Gln-Asp(OtBu)-
Phe-His-Lys(BOC)-Leu-Gln-Thr(tBu)-Phe-
Pro-Gln-Thr(tBu)-Ala-Ile-Gly-OH.

The product is purified by reprecipitation from dimethylformamide and ethyl acetate and condensed with H-Val-Gly-Ala-Pro-NH$_2$ by means of dicyclohexylcarbodiimide and N-hydroxysuccinimide in dimethylformamide, compare Example 1. The protected docosapeptide-amide thus obtained is purified by Craig distribution in the solvent system methanol-buffer-chloroform-carbon tetrachloride (5:3:10:6) and is then decarbobenzoxylated in 80% strength acetic acid in the presence of palladium on charcoal to give H-Thr(tBu)-Tyr(tBu)-Thr(tBu)-Gln-Asp(OtBu)-
Phe-His-Lys(BOC)-Leu-Gln-Thr(tBu)-Phe-Pro-
Gln-Thr(tBu)-Ala-Ile-Gly-Val-Gly-Ala-Pro-NH$_2$.

The free base is produced by means of 0.1 N sodium bicarbonate and is condensed, as in Example 1, with

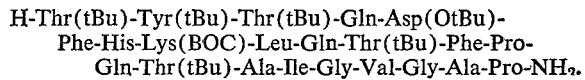

by means of dicyclohexylcarbodiimide and N-hydroxysuccinimide, to give the protected dotriacontapeptide-amide, which is purified as in Example 1.

EXAMPLE 5

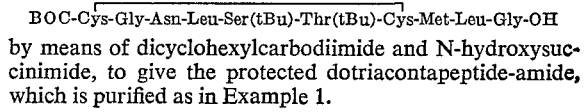
(Val$^8$-Tyr$^{22}$-calcitonin M)

7.0 mg. of

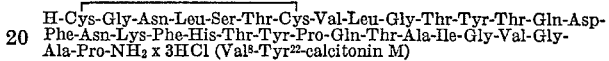

are cooled to 0° C. in a small flask in an icebath, under nitrogen, 0.2 ml. of concentrated hydrochloric acid are then added, and the mixture is left to stand for 7 minutes at 0° C., cooled to a low temperature with acetone/carbon dioxide and degassed in a high vacuum, then cooled in an icebath and concentrated until a glassy-syrupy residue is obtained. This is dissolved in a little water and lyophilized.

In the thin layer chromatograms, the resulting dotriacontapeptide-amide trihydrochloride shows the following Rf values:

on "Alox" D-O (Messrs. Camag; aluminium oxide with 8% of gypsum): $Rf_{52}=0.71$
on "Selecta" 1440 cellulose: $Rf_{101A}=0.59$
(read-to-use plates of Messrs. Schleicher and Schüll): $Rf_{45}=0.65$ Electrophoresis on "Selecta" 1440 cellulose: pH 1.9, 1½ hours, 280 volts, migration distance: 4.8 cm. towards the cathode.

The starting material can be manufactured as follows:

(1) Z-Leu-Gly-OMe 115.8 g. of Z-Leu-ONP are dissolved in 260 ml. of dimethylformamide, 37.7 g. of solid glycine methyl ester hydrochloride are added and 47.1 ml. of triethylamine are added dropwise whilst cooling in ice. The solution is left for 18 hours at +5° C., triethylamine hydrochloride which has precipitated is filtered off and the filtrate is evaporated. The resulting dark yellow oil is dissolved in ethyl acetate and washed, whilst cooling with ice, once with water, four times with dilute, aqueous potassium carbonate solution, once with dilute sodium chloride solution twice with 0.2 N HCl and then with water until the wash water reacts neutral. The ethyl acetate phase is dried over sodium sulphate and evaporated, and the yellow, crystalline residue is recrystallized from benzene-petroleum ether. Melting point: 91–92° C.

The Rf values in a thin layer chromatogram on silica gel are: in the system 115=0.87, in the system toluene-acetone (1:1)=0.60.

(2) H-Leu-Gly-OMe 79.0 g. of Z-Leu-Gly-OMe are dissolved in 400 ml. of methanol and hydrogenated in a duck-shaped flask by means of hydrogen at room temperature, with the addition of 16.5 g. of palladium on charcoal (10% strength). After completion of the hydrogen absorption, the mixture is filtered, the filtrate is evaporated and the resulting yellow oil is immediately used further.

(3) Z-Val-Leu-Gly-OMe 2.68 ml. of glacial acetic acid and 87.5 g. of solid Z-Val-ONP are added at room temperature to a solution of 47.4 g. of H-Leu-Gly-OMe in 250 ml. of N,N-dimethylformamide, and the resulting solution is left for 18 hours at room temperature. It is then evaporated to an oil consistency, the residue dissolved in a mixture of 1.5 litres of ethyl acetate and 0.5 litre of n-butanol, and the solution washed at 0° C., once with 0.8 equivalent (relative to the theoretical amount of p-nitrophenol produced) of dilute sodium hydroxide solution, five times with dilute aqueous potassium carbonate solution, once with water, once with dilute tartaric acid solution and then with water until the wash water reacts neutral. The organic phase is dried over sodium sulphate and evaporated, and the white crystalline residue is recrystallized from methanol-water and chloroform-petroleum ether. The product, which is a single substance according to thin layer chromatography, shows a melting point of 169° C.

In a thin layer chromatogram on silica gel, the R$f$ values are: in the system chloroform-methanol (96:4), 0.45; in the system toluene-acetone (1:1), 0.57.

(4) H-Val-Leu-Gly-OMe 5 g. of Z-Val-Leu-Gly-OMe are dissolved in 100 ml. of methanol and hydrogenated in a duck-shaped shaken flask, at room temperature, by means of hydrogen with the addition of 1.0 g. of palladium on charcoal catalyst (10% strength). After filtration and evaporation, the product, which according to a thin layer chromatogram is a single substance, is immediately used further.

(5) TRI-Cys(TRI)-Val-Leu-Gly-OMe 1.70 g. of H-Val-Leu-Gly-OMe are dissolved in 20 ml. of acetonitrile, 4.70 g. of solid TRI-Cys(TRI)-OH are added, the resulting solution is cooled to 0° C., 1.90 g. of solid dicyclohexylcarbodiimide are added, and the mixture is left for 18 hours at room temperature. The mass, which solidifies after only a short time, is filtered off and recrystallized from chloroform-ethyl acetate-petroleum ether.

The R$f$ values in a thin layer chromatogram on silica gel are: in the system chloroform-methanol (9:1), 0.73; in butyl acetate, 0.53.

(6) H-Cys(TRI)-Val-Leu-Gly-OMe 3.8 g. of the product described under (5) are mixed with 36.3 ml. of glacial acetic acid, 6.3 ml. of water are added and the mixture is thoroughly homogenized. After a short time, the initially cloudy solution becomes clear and white, finely crystalline triphenylcarbinol then gradually begins to separate out. The mixture is filtered off after 1 hour, the filtrate is evaporated, the residue is dissolved in a mixture of ethyl acetate and n-butanol, and the solution is washed three times with dilute, aqueous sodium hydrogen carbonate solution and then with water, until the wash water reacts neutral. The organic phase is evaporated, and the residue is dissolved in a mixture of chloroform and benzene and reprecipitated by means of ethyl adetate and petroleum ether. The resulting, slightly pink-colored powder shows an R$f$ value of 0.20 in a thin layer chromatogram on silica gel in the system chloroform-methanol (98:2).

(7) DPC-Ser(tBu)-Thr(tBu)-Cys(TRI)-Val-Leu-Gly-OMe 1.60 g. of DPC-Ser(tBu)-Thr(tBu)-NH-NH$_2$ are dissolved in 13 ml. of dimethylformamide, the solution is cooled to −15° C., and 3.5 ml. of 2 N HCl in ethyl acetate as well as 0.39 ml. of t-butyl nitrite are added. The solution is left for 15 minutes at −10° C. and then cooled to −20° C., and a solution of 2.50 g. of H-Cys(TRI)-Val-Leu-Gly-OMe and of 0.975 ml. of triethylamine in 9 ml. of dimethylformamide, cooled to 0° C., is rapidly added dropwise. The resulting solution is stirred for 1 hour at −10° C. and left for 18 hours at 0° C. The triethylamine hydrochloride which has crystallized out is filtered off, the filtrate is evaporated, the yellowish red, resinous residue is dissolved in ethyl acetate and the solution is twice washed with dilute, aqueous citric acid solution, once with water, twice with dilute, aqueous sodium hydrogen carbonate solution and with water, until the wash water reacts neutral. The ethyl acetate phase is dried over sodium sulphate, the yellowish red, powdery residue is dissolved in ethyl acetate, and the product is precipitated with petroleum ether at 0° C. The resulting light brown, amorphous powder is recrystallized from acetonitrile. Melting point: 200–201° C.

The R$f$ values in a thin layer chromatogram on silica gel are: in the system toluene-acetone (6:4)=0.51; in chloroform-methanol (97:3)=0.37, and in butyl acetate=0.28.

(8) H-Ser(tBu)-Thr(tBu)-Cys(TRI)-Val-Leu-Gly-OMe·CH$_3$COOH 1.64 g. of the product described under (7) are dissolved in 8.9 ml. of glacial acetic acid at 45° C. and 2.2 ml. of water are added dropwise with vigorous stirring. The yellowish substance, which precipitates whenever water is added, rapidly redissolves. This solution is left for 75 minutes at 45° C., evaporated almost to dryness under a waterpump vacuum at 50° C. bath temperature, and lyophilized. The lyophilized product is suspended in a little water, again lyophilized and further dried in a high vacuum at 40° C. For purification, the lyophilized product is suspended in 10 ml. of methanol at 50° C., and 35 ml. of ethyl acetate are added, followed by 300 ml. of petroleum ether added at room temperature. The finely flocculent precipitate which has formed is stirred for 15 minutes at 0° C. and filtered off. The white powder has a melting point of 204–206° C.

The R$f$ values in a thin layer chromatogram on silica gel are: in the system 96=0.69; in 43C=0.71, and in chloroform-methanol (7:3)=0.80.

(9) H-Ser(tBu)-Thr(tBu)-Cys(TRI)-Val-Leu-Gly-OH 799 mg. of the product described under (8) are mixed with 11 ml. of dimethylformamide, the mixture is warmed to 50° C. and converted to a fine suspension, and 2.7 ml. of water are added, whereupon a white, finely flocculent, precipitate forms. The suspension is mixed with 2.4 ml. of 1 N NaOH at room temperature, with vigorous stirring, and stirred for 10 minutes at room temperature. The resulting, almost completely clear solution is mixed, at 0° C., with 2.4 ml. of 1 N HCl and with 8 ml. of water, and the resulting precipitate is stirred for 90 minutes at 0° C., filtered off, washed with water until free of chloride and reprecipitated from methanol-chloroform-petroleum ether. The completeness of the saponification is examined by thin layer chromatography on silica gel:

R$f$ values:
  system 43C=0.37,
  system 100=0.48,
chloroform-methanol (7:3)=0.30

(10) BOC-Cys(TRI)-Gly-Asn-Leu-Ser(tBu)-Thr(tBu)-Cys(TRI)-Val-Leu-Gly-OH 476 mg. of BOC-Cys(TRI)-Gly-Asn-Leu-NHNH$_2$ are dissolved in 5.2 ml. of dimethylformamide with warming, the resulting solution is cooled to −15° C. and 796 μl. of 1.96 N HCl in ethyl acetate as well as 89 μl. of t-butyl nitrite are added. The solution is left for 10 minutes at −10° C., then cooled to −20° C., and a solution, precooled to −10° C., of 389 mg. of the product described under (9), in 8.2 ml. of dimethylformamide and 276 μl. of triethylamine, is added. The resulting, highly viscous solution is left for 1 hour at −10° C. and 18 hours at +5° C. The solidified reaction mixture is diluted with N,N-dimethylformamide, water is added, the resulting precipitate is filtered off and dried, and the impurities contained therein are dissolved out by repeated extraction with methanol at 60° C.

The Rƒ values of the resulting, white powder in a thin layer chromatogram on silica gel are: in the system 45=0.47; in the system chloroform-methanol (7:3)=0.54; in the system 70=0.53 and in the system 100=0.73.

(11) BOC-Cys-Gly-Asn-Leu-Ser(tBu)-Thr(tBu)-Cys-Val-Leu-Gly-OH 406 mg. of the product described under (10) are dissolved in 40 ml. of dimethylformamide with warming and 0.033 ml. of 1 N hydrochloric acid is added at room temperature. The resulting solution is added dropwise, over the course of 30 minutes, to a gently stirred solution of 620 mg. of iodine in 125 ml. of methanol, kept under a nitrogen atmosphere. The clear, dark brown solution is stirred for a further hour at room temperature, then cooled to 0° C., and treated dropwise with 1 N sodium thiosulphate solution until the brown solution is decolorized. Thereafter the mixture is largely evaporated and peroxide-free ether is added whilst cooling with ice. An initially smeary precipitate is obtained, which gradually becomes powdery. The ether is decanted off and the residue is again stirred with water at 0° C. For further purification, the powder is subjected to a Craig counter-current distribution: 216 mg. of the product are distributed over the first four tubes of a distribution apparatus (phase volumes 3 ml. each), using the solvent system methanol-buffer-chloroform-carbon tetrachloride (5:2:3:1; buffer as in Example 1, under (8)). A multiplicative distribution over a total of 220 stages ($r_{max}$=111, K=1.0) is carried out. The ammonium acetate is sublimed off the resulting pure fractions (distribution tubes Nos. 98–127) in a high vacuum at 40° C. The protected decapeptide, in a thin layer chromatogram on silica gel, shows R$f_{45}$=0.35, R$f_{70}$=0.48 and R$f_{100}$=0.44.

(12) BOC-Cys-Gly-Asn-Leu-Ser(tBu)-Thr(tBu)-Cys-Val-Leu-Gly-Thr(tBu)-Tyr(tBu)-Thr(tBu)-Gln-Asp(OtBu)-Phe-Asn-Lys(BOC)-Phe-His-Thr(tBu)-Tyr(tBu)-Pro-Gln-Thr(tBu)-Ala-Ile-Gly-Val-Gly-Ala-Pro-NH₂

22.0 mg. of the protected docosapeptide-amide H-Thr(tBu) - Tyr(tBu) - Thr(tBu)-Gln-Asp(OtBu)-Phe-Asn-Lys(BOC) - Phe - His - Thr(tBu) - Tyr(tBu)-Pro-Gln-Thr(tBu) - Ala - Ile-Gly-Val-Gly-Ala-Pro-NH₂ (compare Example 1, under (12) and 13.1 mg. of the decapeptide BOC-Cys-Gly-Asn-Leu-Ser(tBu)-Thr(tBu)-Cys-Val-Leu-Gly-OH are dissolved in 0.15 ml. of warm dimethylformamide, the solution is cooled to room temperature, 2.0 mg. of N-hydroxysuccinimide and 2.8 mg. of dicyclohexylcarbodiimide are added, and the mixture is left to stand for 3½ hours at 45° C. Thereafter the solution is added to 3 ml. of initially introduced peroxide-free ether, and the powder which thereupon precipitates is dried and then subjected to a Craig counter-current distribution: 30.0 mg. of the product are introduced into the third tube of a distribution apparatus (phase volumes 3 ml. each), using the solvent system methanol-buffer-chloroform-carbon tetrachloride, 11:3:6:7 (buffer as in Example 1 under (8)). A multiplicative distribution over a total of 250 stages ($r_{max}$=97, K=0.63) is carried out. The ammonium acetate is sublimed off the product obtained by evaporation of the fractions Nos. 93–107, in a high vacuum at 40° C.; the pure, protected dotriacontapeptide-amide is obtained. The Rƒ values in a thin layer chromatogram on silica gel are: R$f_{70}$=0.57; R$f_{100}$=0.31.

EXAMPLE 6

H-Cys-Gly-Asn-Leu-Ser-Thr-Cys-Val-Leu-Gly-Thr-Leu-Thr-Gln-Asp-Leu-Asn-Lys-Leu-His-Thr-Phe-Pro-Gln-Thr-Ala-Ile-Gly-Val-Gly-Ala-Pro-NH₂ x 3HCl (Val⁸-Leu¹²,¹⁶,¹⁹-calcitonin-M)

64.2 mg. of

BOC-Cys-Gly-Asn-Leu-Ser(tBu)-Thr(tBu)-Cys-Val-Leu-Gly-Thr(tBu)-Leu-Thr(tBu)-Gln-Asp(OtBu)-Leu-Asn-Lys(BOC)-Leu-His-Thr(tBu)-Phe-Pro-Gln-Thr(tBu)-Ala-Ile-Gly-Val-Gly-Ala-Pro-NH₂ are cooled to 0° C. in a small flask in an ice bath, under nitrogen, and 1.29 ml. of concentrated hydrochloric acid are then added all at once, whereupon the substance has dissolved after about 1 minute. The solution is then stirred for a further 7 minutes at 0° C. and 15 ml. of glacial acetic acid are then added all at once, and this solution is thoroughly stirred and lyophilized. The lyophilized product is dissolved in a little water, again lyophilized and subsequently left for a further 3 hours at room temperature in a high vacuum over phosphorus pentoxide/potassium hydroxide.

In a thin layer chromatogram, the resulting dotriacontapeptide-amide trihydrochloride shows the following Rƒ values:

on "Alox" D–O (Messrs. Camag; aluminium oxide with 8% of gypsum):
R$f_{52A}$=0.71
R$f_{79}$=0.52 on "Selecta" 1440 cellulose (ready-to-use plates of Messrs. Schleicher and Schüll):
R$f_{45}$=0.59
R$f_{101A}$=0.56

Electrophoresis on "Selecta" 1440 cellulose, pH 1.9, 1½ hours, 280 volts, migration distance: 4.8 cm. towards the cathode.

The starting material can be manufactured as follows:
100 mg. of the protected docosapeptide-amide H-Thr(tBu) - Leu - Thr(tBu) - Gln-Asp(OtBu)-Leu-Asn-Lys(BOC-Leu-His-Thr(tBu)-Phe-Pro-Gln - Thr(tBu) - Ala-Ile-Gly-Val-Gly-Ala-Pro-NH₂ (compare Example 2 under (18)) and 52.4 mg. of BOC-Cys-Gly-Asn-Leu-Ser(tBu)-Thr(tBu)-Cys-Val-Leu-Gly-OH are dissolved in 0.75 ml. of dimethylformamide with warming, the solution is cooled to room temperature, 10.2 mg. of N-hydroxysuccinimide and 13.8 mg. of dicyclohexylcarbodiimide are added, and the mixture is stirred for 3½ hours at 45° C. Thereafter the solution is added to 15 ml. of initially introduced peroxide-free ether and the white precipitate which is thereby formed is dried and then subjected to a Craig counter-current distribution: 129 mg. of the product are introduced into the third and fourth tube of a distribution apparatus (phase volumes 3 ml. each), using the solvent system methanol-buffer-chloroform-carbon tetrachloride, 11:3:6:7 (buffer as in Example 1, under (8)). A multiplicative distribution over a total of 200 stages ($r_{max}$=117, K=1.4) is carried out. The ammonium acetate is sublimed off the product obtained by evaporation of the fractions, in a high vaccum at 40° C.; the pure, protected dotriacontapeptide-amide is obtained. The Rƒ values in a thin layer chromatogram on silica gel are: R$f_{70}$=0.69; R$f_{100}$=0.37; R$f_{110}$=0.66.

EXAMPLE 7

Bmp-Gly-Asn-Leu-Ser-Thr-Cys-Met-Leu-Gly-Thr-Leu-Thr-Gln-Asp-Leu-Asn-Lys-Leu-His-Thr-Phe-Pro-Gln-Thr-Ala-Ile-Gly-Val-Gly-Ala-Pro-NH₂ (Desamino-Leu¹²,¹⁶,¹⁹-calcitonin-M)

35 mg. of

Bmp-Gly-Asn-Leu-Ser(tBu)-Thr(tBu)-Cys-Met-Leu-Gly-Thr(tBu)-Leu-Thr(tBu)-Gln-Asp(OtBu)-Leu-Asn-Lys(BOC)-Leu-His-Thr(tBu)-Phe-Pro-Gln-Thr(tBu)-Ala-Ile-Gly-Val-Gly-Ala-Pro-NH₂ are cooled to 0° C. in a small flask in an ice bath under nitrogen, 0.75 ml. of concentrated hydrochloric acid is then added, and after the material has completely dissolved the mixture is stirred for a further 7 minutes at 0° C. Thereafter it is concentrated in a high vacuum, and the glassy residue is dissolved in 2 ml. of water, lyophilized, again dissolved in 3 ml. of water, again lyophilized and

43 further dried for 2 hours in a high vacuum at room temperature. In a thin layer chromatogram, the resulting dotriacontapeptide trihydrochloride shows the following Rf values:

on "Alox" D-O (Messrs. Camag, aluminum oxide with 8% of gypsum): $Rf_{52}=0.78$
on "Selecta" 1440 cellulose (ready-to-use plates of Messrs. Schleichter and Schüll):
  $Rf_{45}=0.68$
  $Rf_{101A}=0.71$ Electrophoresis on "Selecta" 1440 cellulose=pH 1.9, 1½ hours, 280 volts, migration distance=3.9 cm. to the cathode. In the test according to Kumar et al., J. Endocrinology 33, 470 (1965) the compound is at least 15 times as active as α-thyrocalcitonin.

The starting material can be manufactured as follows:

101 mg. of the protected docosapeptide-amide H-Thr-(tBu)-Leu-Thr(tBu)-Gln-Asp(OtBu) - Leu - Asn - Lys-(BOC)-Leu-His-Thr(tBu)-Phe-Pro-Gln - Thr(tBu) - Ala-Ile-Gly-Val-Gly-Ala-Pro-NH$_2$ (compare Example 2 under (18)) and 61.3 mg. of

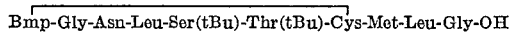
Bmp-Gly-Asn-Leu-Ser(tBu)-Thr(tBu)-Cys-Met-Leu-Gly-OH (compare Belgian Pat. 737,890) are dissolved in 0.755 ml. of warm dimethylformamide, the solution is cooled to room temperature, 10.3 mg. of N-hydroxy-succinimide and 13.9 mg. of dicyclohexylcarbodiimide are added, and the mixture is stirred under nitrogen for 3½ hours at 45° C. Thereafter the solution is added to 20 ml. of peroxide-free ether and the white precipitate which hereupon forms is dried and then subjected to a Craig counter-current distribution: 146 mg. of the product are introduced into the third and fourth tube of a distribution apparatus (phase volumes 3 ml. each), with the solvent system methanol-buffer-chloroform-carbon tetrachloride, 11:3:9:6 (buffer as in Example 1 under (8)) being used. A multiplicative distribution over a total of 300 stages ($r_{max}=95$, $K=0.46$) is carried out. The ammonium acetate is sublimed, in a high vacuum at 40° C., off the product obtained by evaporation of fractions 78–102, and the pure protected dotriacontapeptide-amide is obtained. The Rf values in a thin layer chromatogram on silica gel are: $Rf_{70}=0.44$, $Rf_{107}=0.61$.

EXAMPLE 8

Bmp-Gly-Asn-Leu-Ser-Thr-Cys-Met-Leu-Gly-Thr-Tyr-Thr-Gln-Asp-Phe-Asn-Lys-Phe-His-Thr-Tyr-Pro-Gln-Thr-Ala-Ile-Gly-Val-Gly-Ala-Pro-NH$_2$ (desamino-Tyr$^{22}$-calcitonin-M)

100 mg of

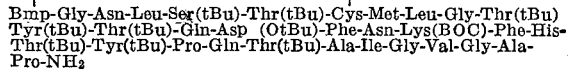
Bmp-Gly-Asn-Leu-Ser(tBu)-Thr(tBu)-Cys-Met-Leu-Gly-Thr(tBu) Tyr(tBu)-Thr(tBu)-Gln-Asp (OtBu)-Phe-Asn-Lys(BOC)-Phe-His-Thr(tBu)-Tyr(tBu)-Pro-Gln-Thr(tBu)-Ala-Ile-Gly-Val-Gly-Ala-Pro-NH$_2$ are covered with 2 ml. of concentrated, pure hydrochloric acid at 0° C., the mixture is flushed with nitrogen, and after solution has occurred (approx. 1–2 minutes), is left to stand for a further 7 minutes in a small closed flask at 0° C. It is then cooled with solid carbon dioxide, a high vacuum is applied, and the solution is subsequently concentrated at 0° C. to give a syrup. This is dissolved in 2 ml. of water and lyophilized, and the residue is again dissolved in 3 ml. of water and lyophilized. The residue is an amorphous powder. It shows the following Rf values on thin layer chromatography:

on "Alox" D-O: $Rf_{52}=0.65$, $Rf_{79}=0.76$,
on cellulose ("Selecta" 1440): $Rf_{101A}=0.68$.

In thin layer electrophoresis at pH 1.9 (like Example 5), the migration distance is 2.4 cm. towards the cathode.

The starting material can be manufactured as follows:
166 mg. of

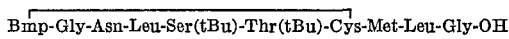
Bmp-Gly-Asn-Leu-Ser(tBu)-Thr(tBu)-Cys-Met-Leu-Gly-OH

44

(compare Belgian Pat. 737,890), 290 mg. of H-Thr(tBu)-Tyr(tBu)-Thr(tBu)-Gln - Asp(OtBu) - Phe - Asn - Lys-(BOC)-Phe-His-Thr(tBu)-Tyr(tBu)-Pro-Gln - Thr(tBu)-Ala-Ile-Gly-Val-Gly-Ala-Pro-NH$_2$ (compare Example 1 under (12)) and 21 mg. of N-hydroxysuccinimide are dissolved in 2.5 ml. of absolute dimethylformamide and mixed with 28 ml. of dicyclohexylcarbodiimide. The small reaction flask is briefly flushed with nitrogen and closed, and the mixture is stirred by means of a magnet for 15 hours at 45° C. The dicyclohexylurea which has crystallized out is separated off by centrifuging, and the crude, protected dotriacontapeptide-amide is precipitated from the supernatant solution by adding 30 ml. of absolute, peroxide-free ether, and is filtered off. Purification is carried out by means of Craig distribution in the system methanol - buffer - chloroform-carbon tetrachloride (11:4:6:7; parts by volume) [buffer as in Example 1 under (8)]. The main fractions, which according to thin layer chromatography are a single substance, are combined, concentrated to dryness, and the ammonium acetate sublimed off in a high vacuum at 40° C. A white, amorphous powder is obtained, which shows the following Rf values on silica gel: $Rf_{52A}=0.25$, $Rf_{100}=0.27$, $Rf_{70}=0.51$.

EXAMPLE 9

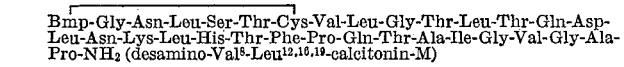
Bmp-Gly-Asn-Leu-Ser-Thr-Cys-Val-Leu-Gly-Thr-Leu-Thr-Gln-Asp-Leu-Asn-Lys-Leu-His-Thr-Phe-Pro-Gln-Thr-Ala-Ile-Gly-Val-Gly-Ala-Pro-NH$_2$ (desamino-Val$^8$-Leu$^{12,16,19}$-calcitonin-M)

53 mg. of

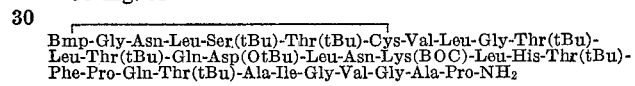
Bmp-Gly-Asn-Leu-Ser(tBu)-Thr(tBu)-Cys-Val-Leu-Gly-Thr(tBu)-Leu-Thr(tBu)-Gln-Asp(OtBu)-Leu-Asn-Lys(BOC)-Leu-His-Thr(tBu)-Phe-Pro-Gln-Thr(tBu)-Ala-Ile-Gly-Val-Gly-Ala-Pro-NH$_2$ are cooled to 0° C. in a small flask in an ice bath under nitrogen, 1.1 ml. of concentrated hydrochloric acid are then added and after complete solution has occurred (duration approx. 1 minute) the mixture is stirred for a further 7 minutes at 0° C. It is then concentrated in a high vacuum, and the glassy residue is dissolved in 2 ml. of water and lyophilized. In a thin layer chromatogram, the dotriacontapeptide amide trihydrochloride obtained shows the following Rf values:

on "Alox" D-O (Messrs. Camag, aluminum oxide with 8% of gypsum): $Rf_{52}=0.75$
on "Selecta" 1440 cellulose (ready-to-use plates of Messrs. Schleicher and Schüll):
  $Rf_{45}=0.72$
  $Rf_{101A}=0.69$ Electrophoresis on "Selecta" 1440 cellulose=pH 1.9, 1½ hours, 280 volts, migration distance=4.0 cm. towards the cathode.

The starting material can be manufactured as follows:

(1) Bmp(TRI)-Gly-Asn-Leu-Ser(tBu)-Thr(tBu)-Cys(TRI)-Val-Leu-Gly-OH 3.79 g. of Bmp(TRI)-Gly-Asn-Leu-NH-NH$_2$ (compare Belgian Pat. 737,890) are dissolved in 50 ml. of dimethylformamide, the solution is cooled to −10° C., and 6.81 ml. of 2.15 N hydrochloric acid in ethyl acetate, followed by 0.69 ml. of tert.butyl nitrite, are then slowly added dropwise. After 15 minutes at −10° C., a solution, cooled to the same temperature, of 5.47 g. of H-Ser(tBu)-Thr(tBu)-Cys(TRI)-Val-Leu-Gly-OH (compare Example 5 under (9)) and 2.85 ml. of triethylamine in 100 ml. of dimethylformamide is added. After 2 hours at—10° C. and 15 hours at 0° C., the reaction mixture is concentrated to approx. 30 ml. in a high vacuum and then mixed with 100 ml. of methanol. The suspension is warmed to 40° C. for 5 minutes, then stirred until it has cooled to 0° C. and filtered, and the precipitate is washed with 50 ml. of cold methanol. After drying in a high vacuum over potassium hydroxide and phosphorus pentoxide, the pure compound, which decomposes at approx. 230–250° C., is obtained. It shows the following Rf values in a thin layer chromatogram on silica gel: in the system chloroform-methanol (8:2), $Rf=0.22$, $Rf_{45}=0.45$, and $Rf_{70}=0.50$.

(2) Bmp-Gly-Asn-Leu-Ser(tBu)-Thr(tBu)-Cys-Val-Leu-Gly-OH 3.87 g. of Bmp(TRI)-Gly-Asn-Leu-Ser(tBu)-Thr(tBu)-Cys(TRI)-Val-Leu-Gly-OH are dissolved in 200 ml. of dimethylformamide with warming, and after cooling to room temperature, the solution is added dropwise, over the course of one hour, to a vigorously stirred solution of 6.35 g. of iodine in 1 litre of methanol. Thereafter the mixture is stirred for a further hour, and the solution is then cooled to 0° C. and decolorized with 1.0 N sodium thiosulphate. After concentration in a waterpump vacuum and a high vacuum to approx. 50 ml., the product is precipitated with ether. The precipitate is twice triturated at 0° C. with 50 ml. portions of water, and is dried over potassium hydroxide and phosphorus pentoxide. This product is purified by subjecting it to a counter-current distribution in the system methanol-buffer-chloroform-carbon tetrachloride (5:2:3:1) (buffer as in Example 1 under (8)). The fractions which are a single substance (K=1.42) are combined, evaporated and freed of ammonium acetate by drying in a high vacuum at 35° C. for 4 hours. The peptide derivative, which is in this manner obtained pure, shows the following $Rf$ values in a thin layer chromatogram on silica gel: $Rf_{70}=0.20$, $Rf_{100}=0.30$ and $Rf_{43C}=0.25$.

(3) Bmp-Gly-Asn-Leu-Ser(tBu)-Thr(tBu)-Cys-Val-Leu-Gly-Thr(tBu)-Leu-Thr(tBu)-Gln-Asp(OtBu)-Leu-Asn-Lys(BOC)-Leu-His-Thr(tBu)-Phe-Pro-Gln-Thr(tBu)-Ala-Ile-Gly-Val-Gly-Ala-Pro-NH₂

101 mg. of the protected decosapeptide-amide H-Thr(tBu) - Leu - Thr(tBu)-Gln-Asp(OtBu) - Leu - Asn-Lys(BOC)-Leu-His-Thr(tBu) - Phe - Pro-Gln-Thr(tBu)-Ala-Ile-Gly-Ala-Pro-NH₂ (compare Example 2 under (18)) and 52.8 mg. of Bmp-Gly-Asn-Leu-Ser(tBu)-Thr(tBu)-Cys-Val-Leu-Gly-OH are dissolved in 0.755 ml. of warm dimethylformamide, the solution is cooled to room temperature, 10.3 mg. of N-hydroxysuccinimide and 13.9 mg. of dicyclohexylcarbodiimide are added and the whole is stirred for 3½ hours at 45° C. Thereafter the solution is added to 20 ml. of peroxide-free ether and the white precipitate which hereupon forms is dried and then subjected to a Craig countercurrent distribution: 144 mg. of the product are introduced into the third and fourth tube of a distribution apparatus (phase volumes 3 ml. each), using the solvent system methanol - buffer - chloroform - carbon tetrachloride, 11:3:9:6 (buffer as in Example 1 under (8)). A multiplicative distribution over a total of 350 stages ($r_{max}=125$; K=0.56) is carried out. The ammonium acetate is sublimed, in a high vacuum at 40° C., off the product obtained by evaporation of fractions Nos. 118–137; the pure, protected dotriacontapeptide-amide is obtained. The $Rf$ values in a thin layer chromatogram on silica gel are: $Rf_{70}=0.49$, $Rf_{107}=0.60$.

EXAMPLE 10

H-Cys-Gly-Asn-Leu-Ser-Thr-Cys-Met-Leu-Gly-Thr-Leu-Thr-Gln-Asp-Leu-Asn-Lys-Leu-His-Thr-Tyr-Pro-Gln-Thr-Ala-Ile-Gly-Val-Gly-Ala-Pro-NH₂ x 3HCl (Leu¹²,¹⁶,¹⁹-Tyr²²-calcitonin-M)

30 mg. of

BOC-Cys-Gly-Asn-Leu-Ser(tBu)-Thr(tBu)-Cys-Met-Leu-Gly-Thr(tBu)-Leu-Thr(tBu)-Gln-Asp(OtBu)-Leu-Asn-Lys(BOC)-Leu-His-Thr(tBu)-Tyr(tBu)-Pro-Gln-Thr(tBu)-Ala-Ile-Gly-Val-Gly-Ala-Pro-NH₂ are cooled to 0° C. in a small flask in an ice-bath, and 0.65 ml. of concentrated hydrochloric acid are then added under nitrogen, whereupon the product has dissolved after about 1 minute. The solution is stirred for a further 7 minutes at 0° C. and 7.3 ml. of glacial acetic acid are then added. The solution thereby obtained is lyophilized, the lyophilized product is dissolved in a little water and again lyophilized, and the white residue is further dried for 3 hours at room temperature in a high vacuum over phosphorus pentoxide/potassium hydroxide. In a thin layer chromatogram on silica gel, the dotriacontapeptide-amide trihydrochloride obtained shows the following $Rf$ values:

on "Alox" D-O (Messrs, Camag, aluminum oxide with 8% of gypsum):
  $Rf_{52}=0.50$
  $Rf_{79}=0.58$
on "Selecta" 1440 cellulose (ready-to-use plates of Messrs. Schleicher and Schüll):
  $Rf_{101A}=0.60$
  $Rf_{45}=0.60$ Electrophoresis on "Selecta" 1440 cellulose=pH 1.9, 1½ hours, 280 volts, migration distance 4.8 cm. towards the cathode.

The starting material can be manufactured as follows:

(1) Z-Asn-Lys(BOC)-Leu-His-Thr(tBu)-Tyr(tBu)-Pro-Gln-Thr(tBu)-Ala-Ile-Gly-OH 3.66 g. of Z-Asn-Lys(BOC)-Leu-His-NHNH₂ (compare Example 2 under (12)) are dissolved in 32 ml. of dimethylformamide, the solution is cooled to —20° C., and 3.75 ml. of 3.23 N HCl in dioxane as well as 0.718 ml. of t-butyl nitrite are added. The solution is stirred for 20 minutes at —15° C., and cooled to —20° C., and a solution of 3.46 g. of H-Thr(tBu)-Tyr(tBu)-Pro-Gln-Thr(tBu-Ala-Ile-Gly-OH x AcOH (compare Example 1) in 52 ml. of dimethylformamide, followed by 2.08 ml. of N-ethyldiisopropylamine, is added. This solution is left to stand for 15 hours at 0° C. and is then concentrated to 20 ml., 200 ml. of water are added, and the resulting white precipitate is filtered off and reprecipitated twice more from dimethylformamide-water.

The resulting substance, which is a single substance according to a thin layer chromatogram, decomposes at approx. 176° C., with foaming. The $Rf$ values in a thin layer chromatogram on silica gel are: $Rf_{43C}=0.32$, $Rf_{70}=0.55$, and $Rf_{100}=0.33$.

(2) Z-Asn-Lys(BOC)-Leu-His-Thr(tBu)-Tyr(tBu)-Pro-Gln-Thr(tBu)-Ala-Ile-Gly-Val-Gly-Ala-Pro-NH₂

3.79 g. of the compound described under (1), and 1.11 g. of H-Val-Gly-Ala-Pro-NH₂ are dissolved in 43 ml. of dimethylformamide, 0.375 g. of N-hydroxysuccinimide and 0.671 g. of dicyclohexylcarbodiimide are added to the solution, and the resulting solution is stirred for 15 hours at 45° C. This solution is subsequently added dropwise to 400 ml. of initially introduced, peroxide-free ether, and the precipitate is filtered off and reprecipitated from methanol-ethyl acetate petroleum ether as well as acetonitrile-water. The resulting, practically pure, product shows the following $Rf$ values in a thin layer chromatogram on silica gel: $Rf_{37}=0.71$, $Rf_{43E}=0.62$ and $Rf_{107}=0.66$.

(3) H-Asn-Lys(BOC)-Leu-His-Thr(tBu)-Tyr(tBu) - Pro-Gln-Thr(tBu)-Ala - Ile - Gly - Val - Gly - Ala - Pro-NH₂ x ACOH 1.0 g. of the product described under (2) is dissolved in 80 ml. of 80% strength acetic acid and hydrogenated by means of hydrogen at room temperature, with the addition of 100 mg. of palladium on charcoal (10% Pd). After filtration, the filtrate is concentrated to approx. 40 ml. and lyophilized. The product shows the following $Rf$ values on silica gel: $Rf_{43E}=0.48$, $Rf_{70}=0.48$ and $Rf_{107}=0.68$.

(4) Z-Thr(tBu)-Leu-Thr(tBu)-Gln-Asp(OtBu)-Leu-Asn-Lys(BOC)-Leu-His-Thr(tBu)-Tyr(tBu)-Pro-Gln - Thr-(tBu)-Ala-Ile-Gly-Val-Gly-Ala-Pro-NH₂

705 mg. of Z-Thr(tBu)-Leu-Thr(tBu)-Gln-Asp(OtBu)-Leu-NHNH₂ (compare Example 2) are dissolved in 10 ml. of warm dimethylformamide, the resulting solution is cooled to —20° C., and 0.584 ml. of 3.2 N HCl in dioxane as well as 1.043 ml. of t-butyl nitrite are added. The solution is stirred for 15 minutes at −10° C. to −15° C. and cooled to −20° C., and a solution of 932 mg. of the product described under (3), in 10 ml. of dimethylformamide, is added, followed by 0.321 ml. of N-ethyldiisopropylamine. This solution is subsequently stirred in an ice bath at 0° C., 80.2 l. of N-ethyldiisopropylamine in 4 portions each of approx. 20 l. are added over the course of 5 hours, and after the last addition of base the solution is left to stand for 15 hours at 0° C. and is then added dropwise to 100 ml. of initially introduced peroxide-free ether. The white precipitate which thereupon forms is filtered off, dried and then subjected to a Craig counter-current distribution: 1.24 g. of the resulting protected docosapeptide-amide are distributed over the second to fourth tube of a distribution apparatus (phase volumes 10 ml. each), with the solvent system methanol-buffer-chloroform carbon tetrachloride (10:3:5:5) (buffer as in Example 1 under (8) being used. The multiplicative distribution over a total of 300 stages is carried out. The ammonium acetate is sublimed off the resulting pure fractions in a high vacuum at 40° C., and the pure, protected docosapeptide-amide is obtained.

(5) H-Thr(tBu)-Leu-Thr(tBu)-Gln - Asp(OtBu) - Leu-Asn-Lys(BOC)-Leu-His-Thr(tBu)-Tyr(tBu)-Pro - Gln-Thr(tBu)-Ala-Ile-Gly-Val-Gly-Ala-Pro-NH₂

100 mg. of the product obtained under (4) are dissolved in 30 ml. of 80% strength acetic acid and hydrogenated for 20 hours at room temperature with hydrogen, with the addition of 20 mg. of palladium on charcoal (10% Pd). The mixture is then filtered and the filtrate is concentrated to approx. 10 ml. and lyophilized. The lyophilized product is dissolved in a little methanol, the solution is adjusted to a pH of between 7 and 8 with saturated sodium hydrogen carbonate solution, and the whole is then added dropwise to an 0.1 N sodium carbonate solution. A white precipitate is obtained, which shows the following R$f$ values in a thin layer chromatogram on silica gel: R$f_{43E}$=0.57, R$f_{70}$=0.65 and R$f_{100}$=0.24.

(6) BOC-Cys-Gly-Asn-Leu-Ser(tBu)-Thr(tBu)-Cys-Met-Leu-Gly-Thr(tBu)-Leu-Thr(tBu)-Gln-Asp(OtBu)-Leu-Asn-Lys(BOC)-Leu-His-Thr(tBu)-Tyr(tBu)-Pro-Gln-Thr(tBu)-Ala-Ile-Gly-Val-Gly-Ala-Pro-NH₂

60 mg. of the docosapeptide-amide described under (5) and 31.4 mg. of

BOC-Cys-Gly-Asn-Leu-Ser(tBu)-Thr(tBu)-Cys-Met-Leu-Gly-OH are dissolved in 0.437 ml. of warm dimethylformamide, the solution is cooled to room temperature, 6.0 mg. of N-hydroxysuccinimide and 8.0 mg. of dicyclohexylcarbodiimide are added and the whole is stirred under nitrogen for 3½ hours at 45° C. Thereafter the solution is added to 9 ml. of peroxide-free ether and the white precipitate which thereupon forms is dried and then subjected to a Craig counter-current distribution: 80 mg. of the product are introduced into the third tube of the distribution apparatus (phase volumes 3 ml. each), with the solvent system methanol-buffer-chloroform carbon tetrachloride, 11:3:6:7 (buffer as in Example 1 under (8)) being used. A multiplicative distribution over a total of 200 stages ($r_{max}$=100, K=1.0) is carried out. The ammonium acetate is sublimed off the pure fractions in a high vacuum at 40° C.; the protected dotriacentapeptide-amide is obtained. The R$f$ values in a thin layer chromatogram on silica gel are R$f_{70}$=0.50 nd R$f_{100}$=0.44.

EXAMPLE 11

H-Cys-Gly-Asn-Leu-Ser-Thr-Cys-Val-Leu-Gly-Thr-Leu-Thr-Gln-Asp-Leu-Asn-Lys-Leu-His-Thr-Tyr-Pro-Gln-Thr-Ala-Ile-Gly-Val-Gly-Ala-Pro-NH₂ (Val⁸-Leu¹²,¹⁶,¹⁹-Tyr²²-calcitonin M)

112.5 mg. of

BOC-Cys-Asn-Leu-Ser(tBu)-Thr(tBu)-Cys-Val-Leu-Gly-Thr(tBu)-Leu-Thr(tBu)-Gln-Asp(OtBu)-Leu-Asn-Lys(BOC)-Leu-His-Thr(tBu)-Tyr(tBu)-Pro-Gln-Thr(tBu)-Ala-Ile-Gly-Val-Gly-Ala-Pro-NH₂ are dissolved in 0.35 ml. of 98% strength formic acid, the solution is cooled to 0° C., 1.2 ml. of ice-cold, concentrated hydrochloric acid are added and the mixture is left to stand for 12 minutes at 0° C. 15 ml. of glacial acetic acid are then added, and the whole is cooled to −25° C. and lyophilized with initial cooling to −25° C. The resulting product is dissolved in 3 ml. of water and again lyophilized. Hereupon the Val⁸, Leu¹²,¹⁶,¹⁹, Tyr²²-calcitonin M is obtained as a white powder, which on thin layer electrophoresis (Avicel ready-to-use plates) (pH=1.9, 2 hours, 16 v./cm.) shows a migration distance of 4.3 cm. towards the cathode. On thin layer chromatography on aluminium oxide plates (D-O of Messrs. Camag, with addition of 12% of gypsum), R$f_{52}$=0.48.

The starting material can be manufactured as follows: 171 mg. of

BOC-Cys-Gly-Asn-Leu-Ser(tBu)-Thr(tBu)-Cys-Val-Leu-Gly-OH (compare Example 2) and 266 mg. of H-Thr(tBu)-Leu-Thr(tBu)-Gln-Asp(OtBu)-Leu-Asn-Lys(BOC)-Leu-His-Thr(tBu)-Tyr(tBu)-Gln-Thr(tBu)-Ala-Ile-Gly-Val-Gly-Ala-Pro-NH₂

(compare Example 10) are mixed with 2 ml. of dimethylformamide and 20 mg. of N-hydroxysuccinimide. The mixture is stirred for 1 hour at 45° C. and then cooled to 30° C. 30 mg. of dicyclohexylcarbodiimide are then added, and the reaction mixture is stirred for 16 hours at 35-40° C. and then transferred into 50 ml. of ether. After 5 hours at 0° C., the crude product which has separated out is filtered off, dried and subjected to a counter-current distribution in the system chloroform-carbon tetrachloride-methanol-buffer (6:7:11:3, parts by volume) (buffer as in Example 1 under (8)). After 300 distribution stages, the pure substance is contained in elements 157–181 (K=1.3). These fractions are combined and evaporated to dryness in vacuo, and the evaporation residue is freed of ammonium acetate by drying at 45° C. and 0.01 mm. Hg.

The purified, protected peptide on thin layer chromatography on silica gel shows R$f_{52A}$=0.29 and R$f_{70}$=0.46.

EXAMPLE 12

Bmp-Gly-Asn-Leu-Ser-Thr-Cys-Val-Leu-Gly-Thr-Leu-Thr-Gln-Asp-Leu-Asn-Lys-Leu-His-Thr-Tyr-Pro-Gln-Thr-Ala-Ile-Gly-Val-Gly-Ala-Pro-NH₂ (Desamino-Val⁸-Leu¹²,¹⁶,¹⁹-Tyr²²-calcitonin).

17 mg. of

Bmp-Gly-Asn-Leu-Ser(tBu)-Thr(tBu)-Cys-Val-Leu-Gly-Thr(tBu)-Leu-Thr(tBu)-Gln-Asp(OtBu)-Leu-Asn-Lys(BOC)-Leu-His-Thr(tBu)-Tyr(tBu)-Pro-Gln-Thr(tBu)-Ala-Ile-Gly-Val-Gly-Ala-Pro-NH₂ are mixed with 0.5 ml. of ice-cold, concentrated hydrochloric acid, the mixture is left to stand for 12 minutes at 0° C. and is then subjected to a vacuum at 0° C. and 0.01 mm. Hg for 1 minute to remove the hydrochloric acid dissolved in the form of a gas, 6 ml. of glacial acetic acid are then added and the mixture is lyophilized. 15 mg. of Desamino-Val⁸, Leu¹²,¹⁶,¹⁹-Tyr²²-calcitonin M dihydrochloride are obtained as an almost colorless powder. On thin layer chromatography on aluminium oxide (D-O of Messrs. Camag. 12% gypsum). R$f_{52}$=0.6; R$f_{79}$=0.72.

The starting material can be manufactured as follows: 48 mg. of

Bmp-Gly-Asn-Leu-Ser(tBu)-Thr(tBu)-Cys-Val-Leu-Gly-OH (compare Example 9),

H-Thr(tBu)-Leu-Thr(tBu)-Gln-Asp(OtBu)-Leu-Asn-Lys(BOC)-Leu-His-Thr(tBu)-Tyr(tBu)-Pro-Gln-Thr(tBu)-Ala-Ile-Gly-Val-Gly-Ala-Pro-NH₂

(compare Example 10), 5 mg. of N-hydroxysuccinimide and 0.7 ml. of dimethylformamide are stirred for 90 minutes at 45° C. and 10 ml. of dicyclohexylcarbodiimide are then added. After a further 16 hours' stirring at 40–45° C., the mixture is introduced into 10 ml. of ether and left to stand overnight at 0° C., and the fine precipitate is centrifuged off, washed with ether and dried at 40° C. and 11 mm. Hg. It is purified by twice reprecipitating it from dimethylformamide-ether; thereafter it is dissolved in methanol and chromatographed through a column ($\phi$=2.8, $h$=40 cm.) of Sephadex LH–20, prepared in methanol. Elution is carried out with methanol, fractions of 3 ml. each being collected. The fractions which absorb in the ultraviolet are evaporated to dryness and their purity is examined by thin layer chromatography on a silica gel plate in the systems 52, 52A, 70 and 100. The pure fractions are combined and evaporated to dryness to yield 40 mg. of protected dotriacontapeptide.

EXAMPLE 13

H-Cys-Gly-Asn-Leu-Ser-Thr-Cys-Met-Leu-Gly-Thr-Leu-Thr-Gln-Asp-Phe-Asn-Lys-Phe-His-Thr-Phe-Pro-Gln-Thr-Ala-Ile-Gly-Val-Gly-Ala-Pro-NH$_2$, 3HCl (Leu$^{12}$-calcitonin M)

60 mg. of

BOC-Cys-Gly-Asn-Leu-Ser(tBu)-Thr(tBu)-Cys-Met-Leu-Gly-Thr(tBu)-Leu-Thr(tBu)-Gln-Asp(OtBu)-Phe-Asn-Lys-(BOC)-Phe-His-Thr(tBu)-Phe-Pro-Gln-Thr(tBu)-Ala-Ile-Gly-Val-Gly-Ala-Pro-NH$_2$ are cooled to 0° C. in a small flask in an ice bath under nitrogen, then 1.29 ml. of concentrated hydrochloric acid are added all at once, whereupon the substance dissolves after approx. 1 minute. The mixture is stirred for a further 7 minutes at 0° C. and then 15 ml. of glacial acetic acid are added all at once. The solution is stirred thoroughly and lyophilized. The resulting product is dissolved in a little water, lyophilized once more and subsequently left for a further 3 hours at room temperature in a high vacuum over phosphorus pentoxide/potassium hydroxide.

The dotriacontapeptidamide trihydrochloride obtained shows the following R$f$ values in a thin layer chromatogram:

on cellulose "Selecta" 1440 (Messrs. Schleicher and Schüll):
R$f_{45}$=0.61
R$f_{101A}$=0.60

Electrophoresis on cellulose "Selecta" 1440, pH 1.9, 1½ hours running time, 280 v., running distance: 5.1 cms. towards the cathode.

The starting material can be manufactured as follows:

(1) Z - Thr(tBu) - Leu - Thr(tBu)-Gln-Asp(OtBu)-Phe-NH-NH$_2$

The tetrapeptide derivative Z - Thr(tBu) - Gln - Asp (OtBu)-Phe-OMe described in Belgian Pat. 737,890 is decarbobenzoxylated in methanol in the presence of palladium on charcoal with hydrogen and the H-Thr(tBu)-Gln-Asp(OtBu)-Phe-OMe obtained condensed with Z-Leu-ONP in dimethylformamide to give the Z-Leu-Thr(tBu)-Gln-Asp(OtBu)-Phe-OMe which crystallizes from a mixture of methanol and water. Melting point 204–205° C., [$\alpha$]$_D^{20}$=+6° (c.=1.978 in chloroform).

This pentapeptide derivative is decarbobenzoxylated by hydrogenation in methanol in the presence of palladium on charcoal and the product obtained is condensed with Z-Thr(tBu)-OSU in dimethylformamide to give Z-Thr (tBu) - Leu - Thr(tBu)-Gln-Asp(OtBu)-Phe-OMe. After precipitation from methanol and water, this melts at 197–199° C.; [$\alpha$]$_D^{20}$=+12° (c.=1.828 in chloroform). The hexapeptide methylester is converted with hydrazine hydrate in methanol into the hydrazide Z-Thr(tBu)-Leu-Thr(tBu)-Gln-Asp(OtBu)-Phe-NH-NH$_2$. This is recrystallized from dimethylformamide and water and subsequently melts at 220–221° C.; [$\alpha$]$_D^{20}$=−65° (c.=1.65 in dimethylformamide).

(2) H - Asn - Lys(BOC) - Phe - His - Thr(tBu) - Phe - Pro - Gln - Thr(tBu) - Ala - Ile - Gly - Val - Gly - Ala - Pro - NH$_2$ (Acetat)

The Z - Asn - Lys(BOC) - Phe-His-Thr(tBu)-Phe-Pro-Gln-Thr(tBu)-Ala-Ile-Gly-OH described in Belgian Pat. 737,890 is condensed with the tetrapeptideamide H-Val-Gly-Ala-Pro-NH$_2$ also described therein according to Weygand-Wünsch in the presence of dicyclohexylcarbodiimide and N-hydroxysuccinimide in dimethlyformamide at 45° C. The hexadecapeptide derivative Z-Asn-Lys (BOC) - Phe - His-Thr(tBu)-Phe-Pro-Gln-Thr(tBu)-Ala-Ile-Gly-Val-Gly-Ala-Pro-NH$_2$ is precipitated by dropping the batch into ether. The separated powder is reprecipitated from methanol, chlorofrom and petroleum ether and subjected to a Craig 850-stage counter-current distribution in the system acetonitrile-buffer-chloroform-methanol (1:1:1:1. parts by volume; buffer=5 g. of ammonium acetate dissolved in 1 litre of 2 N acetic acid). The hexadecapeptide derivative shows K=0.33; R$f_{70}$ =0.50; R$f_{96}$=0.41; R$f_{52}$=0.23 in a thin layer chromatogram on silica gel. The product is hydrogenated in 80% strength acetic acid in order to effect decarbobenzoxylation. The monoacetate of the H-Asn-Lys(BOC)-Phe-His-Thr(tBu) - Phe - Pro-Gln-Thr(tBu)-Ala-Ile-Gly-Val-Gly-Ala-Pro-NH$_2$ obtained shows R$f_{100}$=0.18 in a thin layer chromatogram on silica gel.

(3) H - Thr(tBu) - Leu - Thr(tBu) - Gln - Asp(OtBu) - Phe - Asn - Lys(BOC) - Phe - His - Thr(tBu) - Phe - Pro - Gln - Thr(tBu) - Ala - Ile - Gly - Val - Gly - Ala - Pro - NH$_2$

The Z - Thr(tBu) - Leu - Thr(tBu) - Gln-Asp(OtBu)-Phe-NH-NH$_2$ described in (1) is condensed with the hexadecapeptideamide monoacetate described in (2) according to the azide method as indicated in Example 10(4). By dropping the batch into ether, the docosapeptide derivative is obtained in the form of a powder which is subjected to a Craig 700-stage counter-current distribution in the system methanol-buffer-chloroform-carbon tetrachloride (4:2:1:1, parts by volume). The docosapeptide derivative shows K=0.7; R$f_{70}$=0.55; R$f_{100}$=0.43; R$f_{107}$=0.65 (on silica gel). Hydrogenation in 80% strength acetic acid is carried out in order to remove the carbobenzoxy group. The decarbobenzoxylated product is taken up in a mixture of acetic acid and n-butanol, washed with diluted sodium carbonate solution and then with water and the solvent evaporated. The docosapeptide derivative indicated in the title is thus obtained which shows R$f_{100}$=0.21 in thin layer chromatogram on silica gel.

(4) BOC-Cys-Gly-Asn-Leu-Ser(tBu)-Thr(tBu)-Cys-Met-Leu-Gly-Thr-(tBu)-Leu-Thr(tBu)-Gln-Asp(OtBu)-Phe-Asn-Lys(BOC)-Phe-His-Thr-(tBu)-Phe-Pro-Gln-Thr(tBu)-Ala-Ile-Gly-Val-Gly-Ala-Pro-NH$_2$

The docosapeptide derivative described in (3) is condensed with

BOC-Cys-Gly-Asn-Leu-Ser(tBu)-Thr(tBu)-Cys-Val-Leu-Gly-OH according to the process indicated in Example 6. By dropping the batch into ether, the dotriacontapeptide derivative is obtained as a powder that is subjected to a 400-stage counter-current distribution according to Craig in the system methanol-buffer-chloroform-carbon tetrachloride (11:3:6:7, parts by volume). For the pure product, K=1.0; R$f_{107}$=0.73 (on silica gel).

EXAMPLE 14

H-Cys-Gly-Asn-Leu-Ser-Thr-Cys-Met-Leu-Gly-Thr-Tyr-Thr-Gln-Asp-Leu-Asn-Lys-Phe-His-Thr-Phe-Pro-Gln-Thr-Ala-Ile-Gly-Val-Gly-Ala-Pro-NH$_2$, 3HCl (Leu$^{16}$-Calcitonin M).

60 mg. of

BOC-Cys-Gly-Asn-Leu-Ser(tBu)-Thr(tBu)-Cys-Met-Leu-Gly-Thr(tBu)-Tyr-Thr(tBu)-Gln-Asp(OtBu)-Leu-Asn-Lys(BOC)-Phe-His-Thr(tBu)-Phe-Pro-Gln-Thr(tBu)-Ala-Ile-Gly-Val-Gly-Ala-Pro-NH$_2$ are cooled in a small flask in an ice bath to 0° C. under nitrogen, then 1.29 ml. of concentrated hydrochloric acid are added all at once, whereupon the substance dissolves after approx. 1 minute. The mixture is stirred for a further 7 minutes at 0° C. and then 15 ml. of glacial acetic acid are added all at once. The solution is stirred thoroughly and lyophilized. The resulting product is dissolved in a little water, lyophilized once more and subsequently left for a further 3 hours at room temperature in a high vacuum over phosphorus pentoxide/potassium hydroxide.

In a thin layer chromatogram, the dotricontapeptideamide trihydrochloride shows the following $Rf$ values:

on "Alox" D-O (Messrs. Camag;
aluminium oxide with 8% gypsum):
$Rf_{52}=0.64$
$Rf_{79}=0.67$ on cellulose "Selecta" 1440
(ready-to-use plates of Messrs. Schleicher and Schüll):
$Rf_{45}=0.48$
$Rf_{101A}=0.57$ Electrophoresis on cellulose "Selecta" 1440, pH 1.9, 1½ hours, 280 v., running distance 5.5 cms. towards the cathode.

The starting material can be manufactured as follows:

(1) Z-Thr(tBu)-Tyr(tBu)-Thr(tBu)-Gln-Asp(OtBu)-Leu-NH-NH$_2$

Z-Asp(OtBu)-ONP is condensed with H-Leu-OMe, HCl to Z-Asp(OtBu)-Leu-OMe with addition of N-methylmorpholine in dimethylformamide. The product crystallizes from a mixture of ether and petroleum ether. Melting point 61–62° C. $[\alpha]_D^{20}=-27°$ (c.=1.682 in methanol). Decarbobenzoxylation is carried out by hydrogenation in methanol with addition of hydrogen chloride in the presence of palladium on charcoal. The H-Asp(OtBu)-Leu-OMe which is obtained is condensed with Z-Gln-ONP in dimethylformamide with addition of N-methylmorpholine to give the Z-Gln-Asp(OtBu)-Leu-OMe. This crystallizes from a mixture of acetone and petroleum ether. Melting point 184–185° C. $[\alpha]_D^{20}=37°$ (c.=1.891 in methanol). The product is hydrogenated in methanol in the presence of palladium on charcoal. The H-Gln-Asp(OtBu)-Leu-OMe obtained is condensed in dimethylformamide with Z-Thr(tBu)-OSU to give Z-Thr(tBu)-Gln-Asp(OtBu)-Leu-OMe, which crystallizes from a mixture of methanol and water. Melting point 175–180° C. $[\alpha]_D^{20}=-28°$ (c.=1.95 in methanol). From this product is obtained the H-Thr(tBu)-Gln-Asp(OtBu)-Leu-OMe by means of hydrogenation in methanol in the presence of palladium on charcoal. This is condensed with Z-Tyr(tBu)-OH in dimethylformamide in the presence of dicyclohexylcarbodiimide to give Z-Tyr(tBu)-Thr(tBu)-Gln-Asp(OtBu)-Leu-OMe, which crystallizes from a mixture of methanol and water. Melting point 176–185° C. $[\alpha]_D^{20}=+1°$ (c.=2.005 in chloroform). The carbobenzoxy group is removed by hydrogenation in methanol in the presence of palladium on charcoal and the resulting product condensed with Z-Thr(tBu)-OSU in dimethylformamide. The Z-Thr(tBu)-Tyr(tBu)-Thr(tBu)-Gln-Asp(OtBu)-Leu-OMe is precipitated from a mixture of methanol and water. F. 153–159° C. $[\alpha]_D^{20}=-10°$ (c.=1.981 in methanol). By reacting the methylester with hydrazine hydrate in methanol, the Z - Thr(tBu) - Tyr(tBu)-Thr(tBu)-Gln-Asp(OtBu)-Leu-NH-NH$_2$ is obtained, which is precipitated as a powder from a mixture of methanol and water. The product melts at 175–204° C.

(2) H - Thr(tBu) - Tyr(tBu)-Thr(tBu)-Gln-Asp(OtBu)-Leu - Asn-Lys(BOC)-Phe-His-Thr(tBu)-Phe-Pro-Gln-Thr(tBu)-Ala-Ile-Gly-Val-Gly-Ala-Pro-NH$_2$

Z - Thr(tBu)-Tyr(tBu)-Thr(tBu)-Gln-Asp(OtBu)-Leu-NH-NH$_2$ is condensed with the hexadecapeptideamide monoacetate H-Asn-Lys(BOC)-Phe-His-Thr(tBu)-Phe-Pro - Gln - Thr(tBu) - Ala-Ile-Gly-Val-Gly-Ala-Pro-NH$_2$, AcOH (cf. Example 13) according to the azide method indicated in Example 10(4) and the powder obtained from dropping the batch into ether subjected to a 630-stage Craig counter-current distribution in the system methanol-buffer-chloroform-carbon tetrachloride (4:1:2:2, parts by volume). For the docosapeptide derivative, K=0.6; $Rf_{100}=0.38$ (on silica gel). The product is hydrogenated in 80% strength acetic acid, the decarbobenzoxylated product taken up in a mixture of acetic acid and n-butanol, the solution washed with diluted sodium carbonate solution and evaporated. In a thin layer chromatogram on silica gel, $Rf_{100}=0.35$; $Rf_{70}=0.79$.

(3) BOC-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Leu-Asn-Lys(BOC)-Phe-His-Thr(tBu)-Phe-Pro-Gln-Thr(tBu)-Ala-Ile-Gly-Val-Gly-Ala-Pro-NH$_2$

The docosapeptide derivative obtained in (2) is condensed with

BOC-Cys-Gly-Asn-Leu-Ser(tBu)-Thr(tBu)-Cys-Val-Leu-Gly-OH according to the process indicated in Example 6. The dotriacontapeptide derivative is obtained as a powder by dropping the batch into ether. This product is subjected to a 230-stage counter-current distribution in the system methanol-buffer-chloroform-carbon tetrachloride (11:3:6:7, parts by volume); K=0.9. In a thin layer chromatogram on silica gel, the product shows $Rf_{70}=0.67$; $Rf_{107}=0.84$; $Rf_{100}=0.40$.

EXAMPLE 15

H-Cys-Gly-Asn-Leu-Ser-Thr-Cys-Met-Leu-Gly-Thr-Tyr-Thr-Gln-Asp-Phe-Asn-Lys-Leu-His-Thr-Phe-Pro-Gln-Thr-Ala-Ile-Gly-Val-Gly-Ala-Pro-NH$_2$, 3HCl (Leu$^{19}$-calcitonin M)

60 mg. of

BOC-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys(BOC)-Leu-His-Thr(tBu)-Phe-Pro-Gln-Thr(tBu)-Ala-Ile-Gly-Val-Gly-Ala-Pro-NH$_2$ are cooled to 0° C. in a small flask in an ice bath under nitrogen, then 1.29 ml. of concentrated hydrochloric acid are added all at once, whereupon the substance dissolves after approx. 1 minute. The mixture is stirred for a further 7 minutes at 0° C. and then 15 ml. of glacial acetic acid are added all at once. The solution is stirred thoroughly and lyophilized. The resulting product is dissolved in a little water, lyophilized once more and subsequently left for a further 3 hours at room temperature in a high vacuum over phosphorus pentoxide/potassium hydroxide.

In a thin layer chromatogram, the dotriacontapeptideamide trihydrochloride shows the following $Rf$ values:

on "Alox" D-O (of Messrs. Camag, aluminium oxide with 8% gypsum):
$Rf_{52}=0.63$
$Rf_{79}=0.67$
on cellulose "Selecta" 1440, (ready-to-use plates of Messrs. Schleicher and Schüll):
$Rf_{45}=0.52$
$Rf_{101A}=0.57$ Electrophoresis on cellulose "Selecta" 1440, pH 1.9, 1½ hours, 280 v., running distance towards the cathode 5.6 cms.

The starting material can be manufactured as follows:

(1) H - Asn-Lys(BOC)-Leu-His-Thr(tBu)-Phe-Pro-Gln-Thr(tBu)-Ala-Ile-Gly-Val-Gly-Ala-Pro-NH$_2$

Z - Asn-Lys(BOC)-Leu-His-Thr(tBu)-Phe-Pro-Gln-Thr(tBu)-Ala-Ile-Gly-OH (Example 2 (13)) is condensed with H-Val-Gly-Ala-Pro-NH$_2$ (Example 2, (16)) by means of dicyclohexyl carbodiimide and N-hydroxysuccinimide in dimethylformamide at 45° C. and the powder obtained by dropping the batch into ether is subjected to a 700-stage Craig counter-current distribution in the system acetonitrile-buffer-chloroform-methanol (equal parts by volume, buffer=5.0 g. of ammonium acetate dissolved in 1 litre of 2 N acetic acid. The pure fraction obtained (K value=0.54, Rf values on silica gel: $Rf_{70}=0.66$, $Rf_{100}=0.32$, $Rf_{43C}=0.39$) is hydrogenated in the usual way in 80% strength acetic acid; the hexadecapeptide monoacetate is obtained. Rf values on silica gel: $Rf_{70}=0.53$; $Rf_{107}=0.57$; $Rf_{43E}=0.46$.

(2) H-Thr(tBu)-Tyr(tBu)-Thr(tBu) - Gln - Asp(OtBu)-Phe - Asn - Lys(BOC) - Leu - His - Thr(tBu)-Phe-Pro-Gln - Thr(tBu) - Ala - Ile - Gly - Val - Gly-Ala-Pro-NH₂

Z-Thr(tBu) - Tyr(tBu) - Thr(tBu) - Gln-Asp(OtBu)-Phe-NH-NH₂ (cf. Belgian Pat. 737,890, Example 2 (28)) is condensed with the hexadecapeptideamide-monoacetate H-Asn - Lys(BOC) - Leu - His - Thr(tBu) - Phe - Pro-Gln - Thr(tBu) - Ala - Ile - Gly - Val - Gly - Ala - Pro-NH₂, AcOH according to the azide method as indicated in Example 10 (4). The powder which is obtained by dropping the batch into ether is subjected to a 500-stage Craig counter-current distribution in the system methanol-buffer-chloroform-carbon tetrachloride(4:1:2:2, parts by volume). The ammonium acetate is sublimed off from the pure fractions obtained (K value=0.6). The protected docosapeptideamide which is obtained shows the following Rf values on silica gel: $Rf_{70}=0.72$; $Rf_{100}=0.44$. The product is hydrogenated in 80% strength acetic acid in the usual way. The docosapeptideamide of the title is obtained by taking up the product in a mixture of acetic acid and n-butanol, washing it with diluted sodium carbonate solution, washing it neutral with water and evaporating it; $Rf_{100}=0.36$ (on silica gel).

(3) BOC-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys-(BOC)-Leu-His-Thr(tBu)-Phe-Pro-Gln-Thr(tBu)-Ala-Ile-Gly-Val-Gly-Ala-Pro-NH₂

The docosapeptide derivative obtained in (2) is condensed with

BOC-Cys-Gly-Asn-Leu-Ser(tBu)-Thr(tBu)-Cys-Met-Leu-Gly-OH according to the process indicated in Example 6. The docosacontapeptide-derivative is obtained as a powder by dropping the batch into ether. It is subjected to a 200-stage counter-current distribution in the system methanol-buffer-chloroform-carbon tetrachloride (11:3:6:7, parts by volume); K=1.2. In a thin layer chromatogram on silica gel the product shows $Rf_{70}=0.5$.

We claim:
1. A peptide of the formula

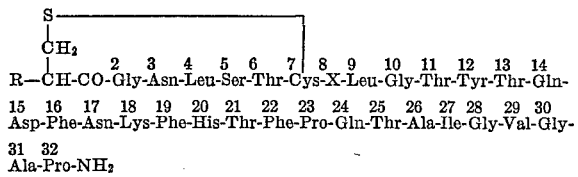

wherein R is hydrogen, free amino or acylamino in which acyl is a lower mono-basic or dibasic alkanoyl, lower alkyloxycarbonyl, benzyloxycarbonyl, L - pyroglutamyl, carbamoyl, N-lower alkylcarbamoyl, N-phenylcarbamoyl, or N-phenylthiocarbamoyl, X represents the radical of L-methionine, L - valine, L - norvaline, L - leucine, L-isoleucine, L - norleucine or L - α - aminobutyric acid and wherein at least one of the aminoacids in positions 11, 12, 16, 17, 19, 20, 22 and 24 is replaced as follows: L-threonine[11] by L - lysine, L - tyrosine[12] by L - leucine, L-phenylalanine[16] by L - leucine, L - asparagine[17] by L-histidine, L - phenylalanine[19] by L - leucine, L - histidine[20] by L - glutamine, L - phenylalanine[22] by L - tyrosine and L-glutamine[24] by L-arginine; therapeutically acceptable acid addition salts and complexes with a member selected from the group consisting of zinc phosphate, zinc pyrophosphate and zinc hydroxide, with the proviso that all amino acid residues in the above formula, other than glycine and β-mercaptoproprionic acid, are of the L-configuration.

2. A peptide as claimed in claim 1, wherein X stands for L-methionine and wherein the aminoacid in 11-position is L-lysine and that in 24-position is L-arginine.

3. A peptide as claimed in claim 1, wherein X stands for L-methionine and wherein the aminoacid in positions 12, 16 and 19 is L-leucine.

4. A peptide as claimed in claim 1, wherein X stands for L-valine and wherein the aminoacid in positions 12, 16 and 19 is L-leucine.

5. A peptide as claimed in claim 1, wherein X stands for L-valine and wherein the aminoacid in positions 12, 16 and 19 is L-leucine, and the aminoacid in 22-position is L-tyrosine.

6. A peptide as claimed in claim 1, wherein X stands for L-methionine and wherein the aminoacid in positions 12, 16 and 19 is L-leucine, and the aminoacid in 22-position is L-tyrosine.

7. A peptide as claimed in claim 1 which R is hydrogen.

8. A peptide as claimed in claim 1, wherein R is hydrogen, X stands for L-methionine and wherein the aminoacid in positions 12, 16 and 19 is L-leucine.

9. A peptide as claimed in claim 1, wherein R is hydrogen, X stands for L-valine and wherein the aminoacid in positions 12, 16 and 19 is L-leucine.

10. A peptide as claimed in claim 1, wherein R is hydrogen, X stands for L-methionine and wherein the aminoacid in positions 12, 16 and 19 is L-leucine, and the aminoacid in 22-position is L-tyrosine.

References Cited
FOREIGN PATENTS

| | | | |
|---|---|---|---|
| 1,806,135 | 7/1969 | Germany | 260—112.5 |
| 1,950,711 | 4/1970 | Germany | 260—112.5 |

OTHER REFERENCES

Sieber et al.: Helv. Chim. Acta 51, 2057–2061 (1968).
Guttmann et al.: Helv. Chim. Acta. 52, 1789–1795 (1969).
Guttmann et al.: Calcitmin 1969, Proceedings of the Second International Symp., London, July 21–24, 1969, Wm. Heinemann Med. Books, London (1970) pp. 74–79. effective date under 102, August 1969.
Niall et al.: Proc. Natl. Acad-Sci. 64, 771–778 (1969).
Potts et al.: Calcitmin 1969, Proceedings of the Second Intl. Symp., London, July 21–24, 1969, William Heineman Medical Books, London (1970), pp. 70–72, effective date August 1969.
MacIntyre: Calcitmin 1969, Wm. Heinemann Medical Books, London (1970), pp. 1–13.

LEWIS GOTTS, Primary Examiner
R. J. SUYAT, Assistant Examiner

U.S. Cl. X.R.
424—177